(12) United States Patent
Tamegai

(10) Patent No.: US 10,225,481 B2
(45) Date of Patent: Mar. 5, 2019

(54) ELECTRONIC APPARATUS, METHOD FOR CONTROLLING ELECTRONIC APPARATUS, AND NON-TRANSITORY COMPUTER READABLE RECORDING MEDIUM

(71) Applicant: KYOCERA CORPORATION, Kyoto (JP)

(72) Inventor: Atsushi Tamegai, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 258 days.

(21) Appl. No.: 15/413,124

(22) Filed: Jan. 23, 2017

(65) Prior Publication Data

US 2017/0214836 A1 Jul. 27, 2017

(30) Foreign Application Priority Data

Jan. 27, 2016 (JP) ................. 2016-013253

(51) Int. Cl.
| | | |
|---|---|---|
| *H04N 5/235* | (2006.01) | |
| *G03B 17/08* | (2006.01) | |
| *G06K 9/62* | (2006.01) | |
| *H04N 5/232* | (2006.01) | |
| *H04N 5/265* | (2006.01) | |
| *H04N 9/07* | (2006.01) | |
| *H04N 9/73* | (2006.01) | |
| *G06K 9/20* | (2006.01) | |

(52) U.S. Cl.
CPC .......... *H04N 5/2351* (2013.01); *G03B 17/08* (2013.01); *H04N 5/23238* (2013.01); *H04N 9/07* (2013.01); *H04N 9/735* (2013.01); *G06K 9/6215* (2013.01); *G06K 2009/2045* (2013.01)

(58) Field of Classification Search
CPC .... G03B 17/08; G03B 21/60; H04N 5/23238; H04N 5/2351; H04N 9/07; H04N 9/735
See application file for complete search history.

(56) References Cited

U.S. PATENT DOCUMENTS

| | | | | |
|---|---|---|---|---|
| 2007/0292118 | A1* | 12/2007 | Tr Ff ..................... | G03B 17/08 396/25 |
| 2011/0058085 | A1* | 3/2011 | Ito .......................... | G03B 13/00 348/333.02 |

(Continued)

FOREIGN PATENT DOCUMENTS

JP 2014-103690 6/2014

*Primary Examiner* — Nathnael Aynalem
(74) *Attorney, Agent, or Firm* — Duane Morris LLP

(57) ABSTRACT

An underwater sensor is configured to detect an underwater state in which at least part of an exterior of the electronic apparatus is located in the water and an above-water state in which the at least part of the exterior is not located in the water. An acceleration sensor is configured to detect acceleration. An image sensor includes a transparent member located in the exterior and is configured to receive light entering through the transparent member and generate a captured image. At least one processor is configured to identify a water surface image among a plurality of captured images generated by the image sensor, based on the acceleration and a transition timing at which one of the underwater state and the above-water state changes to the other state, the water surface image being captured when the transparent member reaches a water surface.

17 Claims, 19 Drawing Sheets

(56) References Cited

U.S. PATENT DOCUMENTS

2011/0074945 A1* 3/2011 Watanabe .............. H04N 5/232
  348/81
2014/0155709 A1* 6/2014 Ikai .................... A61B 1/00006
  600/302

* cited by examiner

FIG. 5
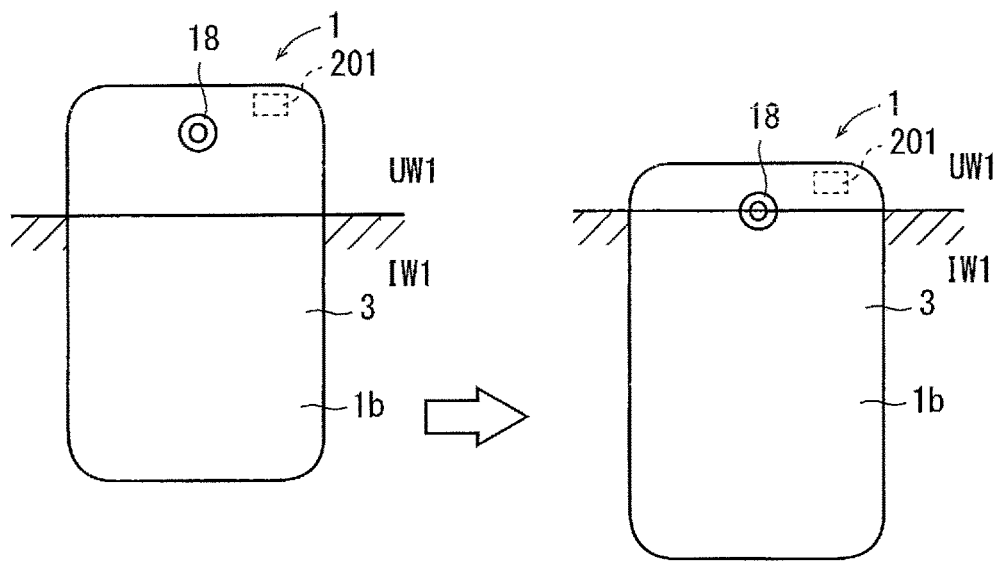
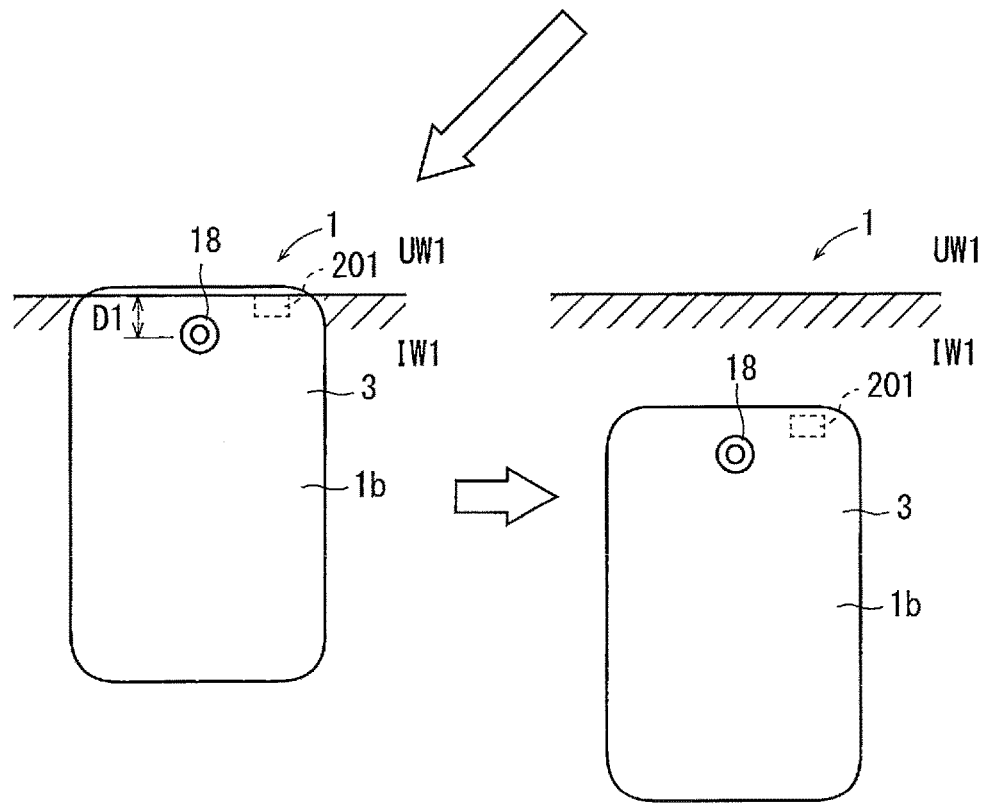

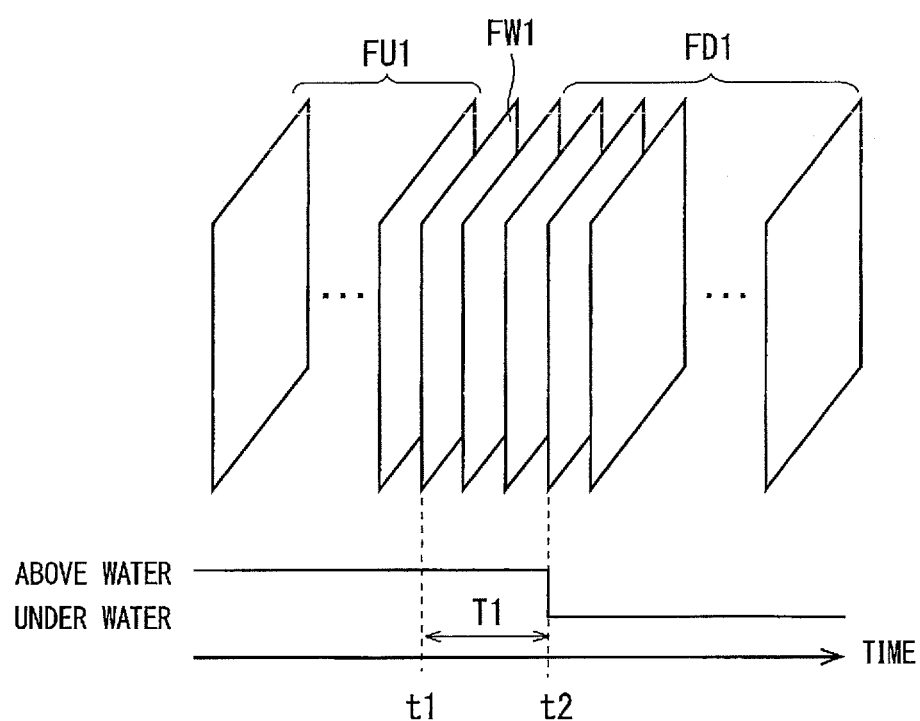
F I G. 7

F I G. 2 0
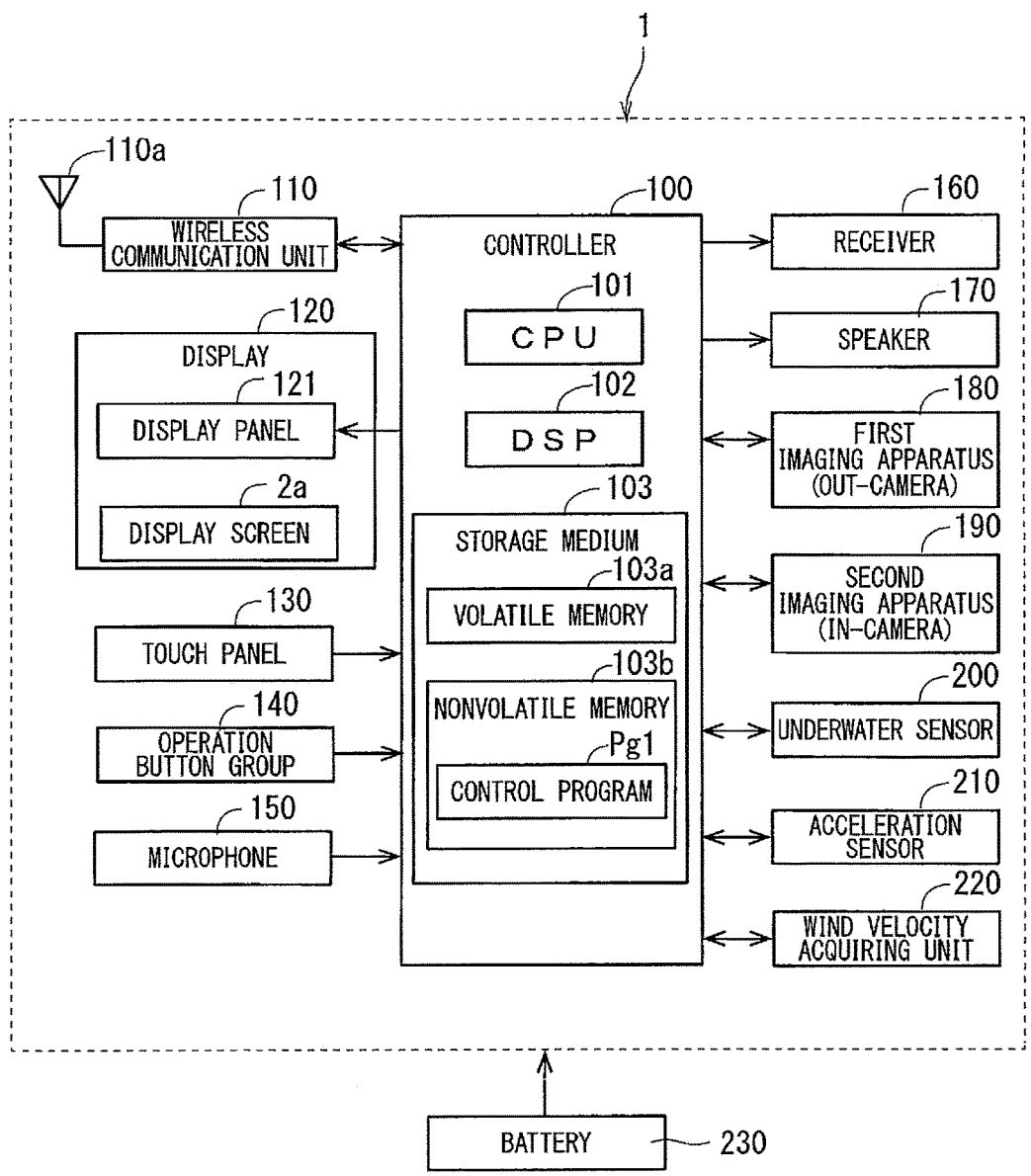

F I G. 2 1
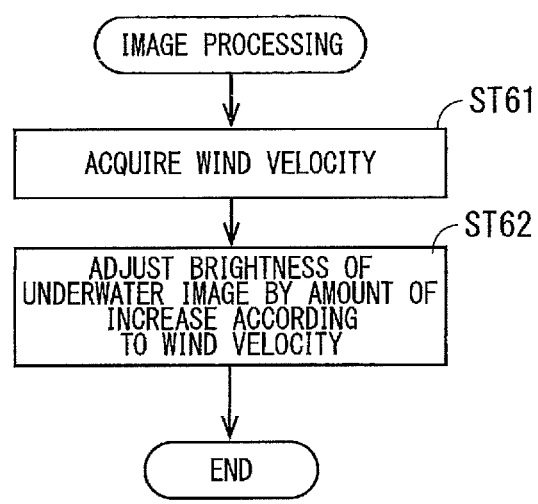

F I G. 2 2
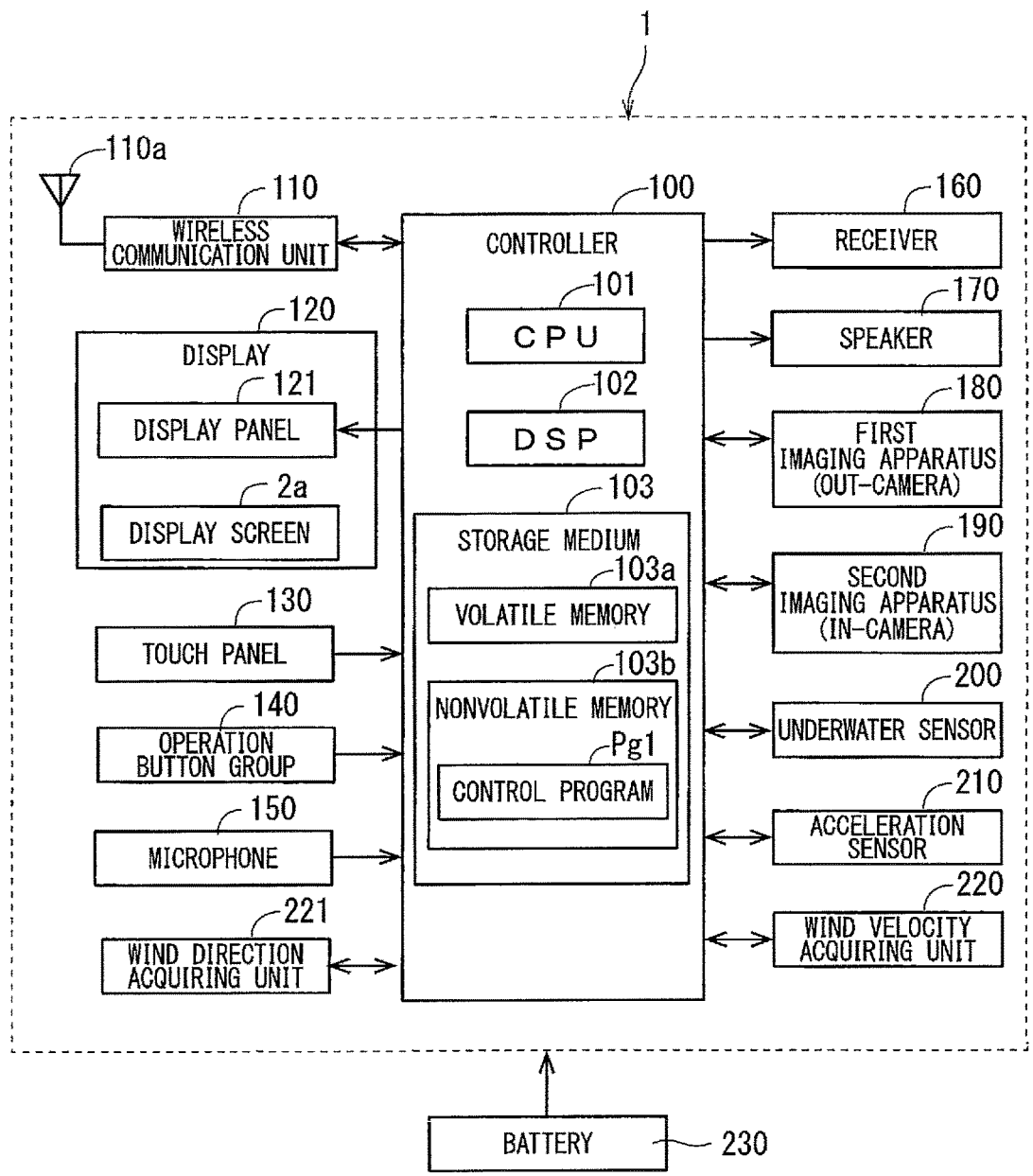

F I G. 2 4
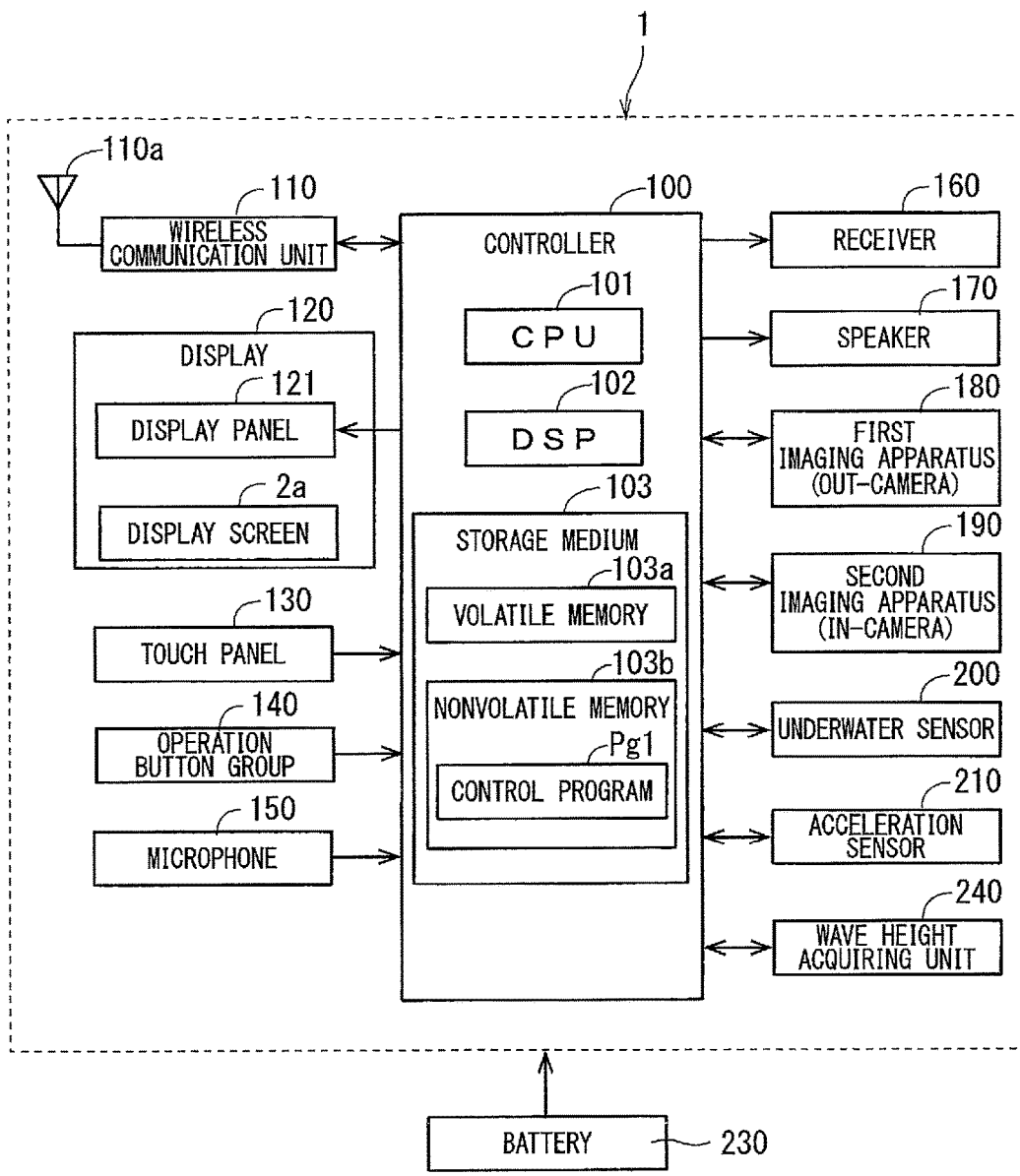

ELECTRONIC APPARATUS, METHOD FOR CONTROLLING ELECTRONIC APPARATUS, AND NON-TRANSITORY COMPUTER READABLE RECORDING MEDIUM

CROSS-REFERENCE TO RELATED APPLICATION

The present application claims priority under 35 U.S.C. § 119 to Japanese Patent Application No. 2016-013253, filed on Jan. 27, 2016, entitled "ELECTRONIC APPARATUS, METHOD FOR CONTROLLING ELECTRONIC APPARATUS, CONTROL PROGRAM, AND CONTROL DEVICE". The content of which is incorporated by reference herein in its entirety.

FIELD

Embodiments of the present disclosure relate to an electronic apparatus, a method for controlling an electronic apparatus, and a non-transitory computer readable recording medium.

BACKGROUND

Various techniques have conventionally been proposed for an electronic apparatus having waterproof functions that enable the underwater use.

SUMMARY

An electronic apparatus, a method for controlling an electronic apparatus, and a non-transitory computer readable recording medium are disclosed. In one embodiment, an electronic apparatus includes an exterior, an underwater sensor, an acceleration sensor, an image sensor, and at least one processor. The underwater sensor is configured to detect an underwater state in which at least part of the exterior is located in the water and an above-water state in which the at least part of the exterior is not located in the water. The acceleration sensor is configured to detect acceleration. The image sensor includes a transparent member located in the exterior and is configured to receive light entering through the transparent member and generate a captured image. The at least one processor is configured to identify a water surface image among a plurality of captured images generated by the image sensor, based on the acceleration and a transition timing at which one of the underwater state and the above-water state changes to the other state, the water surface image being captured when the transparent member reaches a water surface.

In one embodiment, a method for controlling an electronic apparatus includes a first step to a fourth step. The first step detects an underwater state in which at least part of an exterior of the electronic apparatus is located in the water and an above-water state in which the at least part of the exterior is not located in the water. The second step detects acceleration. The third step receives light through a transparent member located in the exterior and generates a captured image. The fourth step identifies a water surface image among a plurality of captured images generated, based on a transition timing at which one of the underwater state and the above-water state changes to the other state and the acceleration, the water surface image being captured when the transparent member reaches a water surface.

In one embodiment, a non-transitory computer readable recording medium is configured to store a control program for controlling an electronic apparatus. The control program causing the electronic apparatus to execute a first step to a fourth step. The first step detects an underwater state in which at least part of an exterior of the electronic apparatus is located in the water and an above-water state in which the at least part of the exterior is not located in the water. The second step detects acceleration. The third step receives light through a transparent member located in the exterior and generates a captured image. The fourth step identifies a water surface image among a plurality of captured images generated, based on a transition timing at which one of the underwater state and the above-water state changes to the other state and the acceleration, the water surface image being captured when the transparent member reaches a water surface.

BRIEF DESCRIPTION OF THE DRAWINGS

FIG. 5 illustrates a view schematically showing one example of how imaging is performed while the electronic apparatus is moved.

FIG. 7 illustrates a view schematically showing one example of captured images generated by imaging.

FIG. 20 illustrates a view schematically showing one example of the electrical configuration of the electronic apparatus.

FIG. 21 illustrates a flowchart showing one example of specific actions of the electronic apparatus.

FIG. 22 illustrates a view schematically showing one example of the electrical configuration of the electronic apparatus.

FIG. 24 illustrates a view schematically showing one example of the electrical configuration of the electronic apparatus.

DETAILED DESCRIPTION

Figure 1:
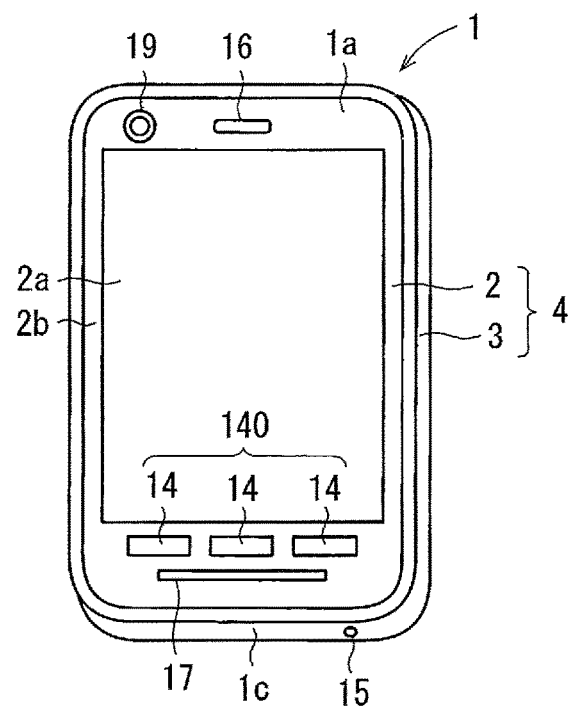
FIG. 1 illustrates a perspective view schematically showing one example of an external appearance of an electronic apparatus.

Each example of embodiments and various modifications will be described below with reference to the drawings. The portions having the same configuration and functions have the same reference numerals in the diagrams. Accordingly, the repeated description will be omitted from the following description. The dimensions and the positional relationships of the respective structures in the respective drawings, which are schematically shown, may be appropriately modified.

One Example of Embodiment

<One Example of External Appearance of Electronic Apparatus>

Figure 2:
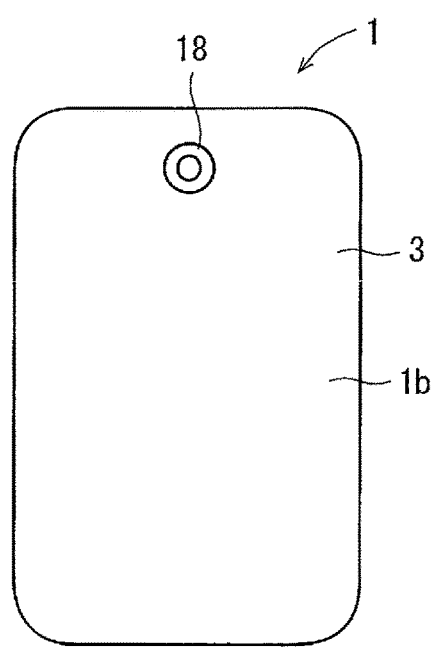
FIG. 2 illustrates a rear view schematically showing one example of the external appearance of the electronic apparatus.

FIG. 1 illustrates a perspective view schematically showing one example of an external appearance of an electronic apparatus 1. FIG. 2 illustrates a rear view schematically showing one example of the external appearance of the electronic apparatus 1. The electronic apparatus 1 is, for example, a so-called smartphone having waterproof functions. For example, the electronic apparatus 1 may communicate with another communication device via a base station and a server.

As illustrated in FIGS. 1 and 2, the electronic apparatus 1 includes an exterior (housing) 4. For example, the exterior 4 includes a cover panel 2 located on a front surface 1a of the electronic apparatus 1 and an apparatus case 3 to which the cover panel 2 is attached. The exterior 4 of the electronic apparatus 1 has, for example, a plate shape substantially rectangular in a plan view.

The cover panel 2 includes a display screen 2a on which various types of information such as characters, symbols, and graphics displayed by a display panel 121, which will be described below, are displayed. Most of a peripheral portion 2b of the cover panel 2 that surrounds the display screen 2a is opaque and/or not transparent because of, for example, a film or the like that is attached thereto. Most of the peripheral portion 2b of the cover panel 2 accordingly serves as a non-display area on which the various types of information, which are displayed by the display panel 121, are not displayed.

A touch panel 130, which will be described below, is attached to the rear surface of the display screen 2a. The display panel 121 is attached to the surface opposite to the surface on the display screen 2a side of the touch panel 130. In other words, the display panel 121 is attached to the rear surface of the display screen 2a with the touch panel 130 therebetween. Thus, the user can provide various instructions to the electronic apparatus 1 by operating the display screen 2a with an operator such as a finger. The positional relationship between the touch panel 130 and the display panel 121 is not limited to the relationship described above. For example, at least part of the configuration of the touch panel 130 may be buried in the display panel 121 as long as an operation performed on the display screen 2a with an operator can be detected.

As illustrated in FIG. 1, a second lens transparent member 19 is located in, for example, the upper-side end portion of the cover panel 2. The second lens transparent member 19 allows a lens of a second imaging apparatus 190, which will be described below, to be visually recognized from the outside of the electronic apparatus 1. A receiver hole 16 is located in the upper-side end portion of the cover panel 2. A speaker hole 17 is located in the lower-side end portion of the cover panel 2. A microphone hole 15 is located in a bottom surface 1c of the electronic apparatus 1 or a bottom surface (a lower side surface) of the apparatus case 3.

As illustrated in FIG. 2, a first lens transparent member 18 is located in, for example, the upper-side end portion of a back surface 1b of the exterior 4 of the electronic apparatus 1, namely, the upper-side end portion of a back surface of the apparatus case 3. The first lens transparent member 18 allows a lens of a first imaging apparatus 180, which will be described below, to be visually recognized from the outside of the electronic apparatus 1.

An operation button group 140 including a plurality of operation buttons 14 is located inside the apparatus case 3. Each of the operation buttons 14 is a hardware button such as a press button. The operation button may be referred to as an "operation key" or a "key". Each of the operation buttons 14 is exposed from, for example, the lower-side end portion of the cover panel 2. The user can provide various instructions to the electronic apparatus 1 by operating each of the operation buttons 14 with the finger or the like.

The plurality of operation buttons 14 include, for example, a home button, a back button, and a history button. The home button is an operation button for causing the display screen 2a to display a home screen (initial screen). The back button is an operation button for switching the display of the display screen 2a to its previous screen. The history button is an operation button for causing the display screen 2a to display a list of the applications executed by the electronic apparatus 1.

<One Example of Electrical Configuration of Electronic Apparatus>

Figure 3:
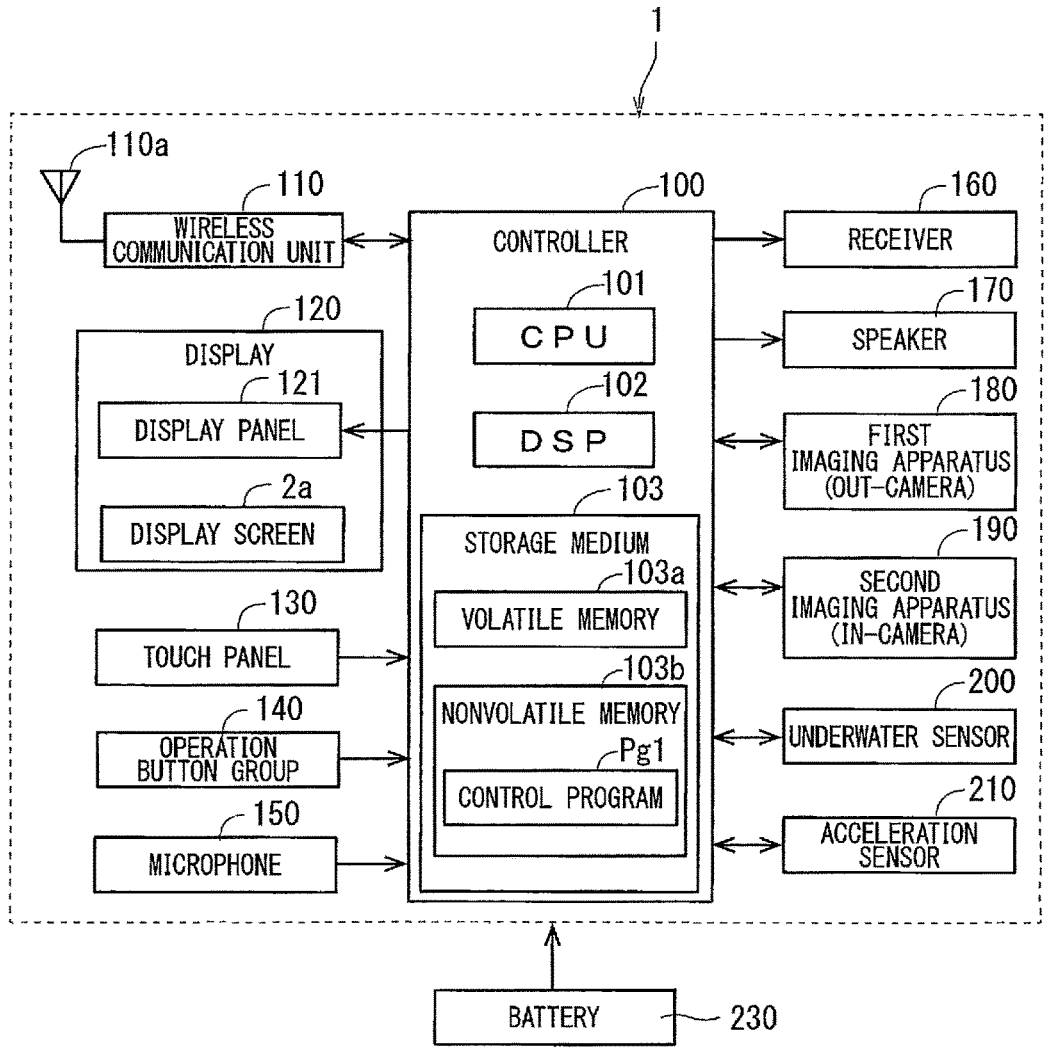
FIG. 3 illustrates a view schematically showing one example of an electrical configuration of the electronic apparatus.

FIG. 3 illustrates a block diagram schematically showing one example of an electrical configuration of the electronic apparatus 1. As illustrated in FIG. 3, the electronic apparatus 1 includes a controller 100, a wireless communication unit 110, a display 120, the touch panel 130, the operation button group 140, and a microphone 150. The electronic apparatus 1 further includes a receiver 160, a speaker 170, the first imaging apparatus 180, the second imaging apparatus 190, an underwater sensor 200, an acceleration sensor 210, and a battery 230. The exterior 4 of the electronic apparatus 1 houses the respective structural components of the electronic apparatus 1.

The controller 100 is, for example, a type of microprocessing apparatus. The controller 100 includes, for example, a central processing unit (CPU) 101 being an electric circuit, a digital signal processor (DSP) 102, and a storage medium 103. The controller 100 can manage the overall operation of the electronic apparatus 1 by controlling the other structural components of the electronic apparatus 1. The electronic apparatus 1 may further include a co-processor such as a System-on-a-Chip (SoC), a micro control unit (MCU), and a field-programmable gate array (FPGA). The electronic apparatus 1 may cause the central processing unit (CPU) and the co-processor to cooperate with each other or may selectively use one of them in order to control the various structural components.

The storage medium 103 includes a non-transitory recording medium readable by the CPU 101 and the DSP 102 such as a read-only memory (ROM) and a random-access memory (RAM). The ROM of the storage medium 103 is, for example, a flash ROM (flash memory) that is a nonvolatile memory. The storage medium 103 stores a main program for controlling the electronic apparatus 1 and a plurality of application programs (hereinafter may be merely referred to as "applications"). The CPU 101 and the DSP 102 execute the various programs in the storage medium 103 to achieve various functions of the controller 100. The storage medium 103 stores, for example, a call application for performing a voice call and a video call and an imaging application for capturing a still image or a video with the first imaging apparatus 180 or the second imaging apparatus 190. The applications stored in the storage medium 103 include, for example, a control program Pg1 for controlling the electronic apparatus 1.

The storage medium 103 may include a non-transitory computer readable recording medium other than the ROM and the RAM. The storage medium 103 may include, for example, a compact hard disk drive and a solid state drive (SSD). The storage medium 103 may be replaced with the other storage medium. The storage medium may be located outside the controller 100. The storage medium 103 or the other storage medium may store information, which will be described below. All or some of the functions of the controller 100 may be achieved by a hardware circuit that needs no software to achieve the functions above. In other words, it is sufficient that the controller 100 includes a circuit.

The controller 100 may include at least one processor for providing control and processing capability to perform various functions as described in further detail below. In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The wireless communication unit (communication circuit) 110, which is a so-called communication interface, includes an antenna 110a. The wireless communication unit 110 can receive, for example, a signal from a mobile phone different from the electronic apparatus 1 or a signal from a communication apparatus such as a web server connected to the Internet through the antenna 110a via the base station. The wireless communication unit 110 can amplify and down-convert the signal received by the antenna 110a and then output a resultant signal to the controller 100. The controller 100 can modulate the received signal to acquire various types of information (such as a sound signal indicative of voice or music) contained in the received signal.

The wireless communication unit 110 can also up-convert and amplify a transmission signal generated by the controller 100 to wirelessly transmit the processed transmission signal from the antenna 110a. The transmission signal from the antenna 110a is received, via the base station, by the mobile phone different from the electronic apparatus 1 or the communication apparatus such as the web server connected to the Internet.

The display 120 includes the display panel 121 and the display screen 2a. The display panel 121 is, for example, a liquid crystal panel or an organic electroluminescent (EL) panel. The display panel 121 can display various Types of information such as characters, symbols, and graphics under the control of the controller 100. The various types of information, which the display panel 121 displays, are displayed on the display screen 2a.

The touch panel 130 is, for example, a projected capacitive touch panel. The touch panel 130 can detect an operation performed on the display screen 2a with the operator such as the finger. When the user operates the display screen 2a with the operator such as the finger, an electrical signal corresponding to the operation is input from the touch panel 130 to the controller 100. The controller 100 can accordingly specify contents of the operation performed on the display screen 2a based on the electrical signal from the touch panel 130, thereby performing the process in accordance with the contents. The user can also provide various instructions to the electronic apparatus 1 by operating the display screen 2a with, for example, a pen for capacitive touch panel such as a stylus pen, instead of the operator such as the finger.

When the user operates each of the operation buttons 14 of the operation button group 140, the operation button 14 outputs an operation signal indicating that the operation button 14 has been operated to the controller 100. The controller 100 can accordingly determine, based on the operation signal from each of the operation buttons 14, whether the operation button 14 has been operated. The controller 100 can perform the process corresponding to the operation button 14 that has been operated. Each of the operation buttons 14 may be a software button displayed on the display screen 2a instead of the hardware button such as the press button. In this case, the touch panel 130 detects the operation performed on the software button, and the controller 100 can perform the process corresponding to the software button that has been operated.

The microphone 150 can convert the sound from the outside of the electronic apparatus 1 into an electrical sound signal and then output the electrical sound signal to the controller 100. The sound from the outside of the electronic apparatus 1 is, for example, taken inside the electronic apparatus 1 through the microphone hole 15 located in the bottom surface (lower side surface) of the apparatus case 3 and input to the microphone 150.

The speaker 170 is, for example, a dynamic speaker. The speaker 170 can convert an electrical sound signal from the controller 100 into a sound and then output the sound. The sound output from the speaker 170 is, for example, output to the outside of the electronic apparatus 1 through the speaker hole 17 located in the lower-side end portion of the cover panel 2. The sound output from the speaker hole 17 is set to a volume high enough to be heard in the place apart from the electronic apparatus 1.

The receiver 160 comprises, for example, a dynamic speaker. The receiver 160 can convert an electrical sound signal from the controller 100 into a sound and then output the sound. The receiver 160 outputs a reception sound, for example. The sound output from the receiver 160 is output to the outside through the receiver hole 16 located in the upper-side end portion of the cover panel 2, for example. The volume of the sound output through the receiver hole 16 is, for example, set to be lower than the volume of the sound output from the speaker 170 through the speaker hole 17.

The receiver 160 may be replaced with a piezoelectric vibrator. The piezoelectric vibrator can vibrate based on a voice signal from the controller 100. The piezoelectric vibrator is located on, for example, the rear surface of the cover panel 2. The piezoelectric vibrator can vibrate the cover panel 2 by the vibration of the piezoelectric vibrator based on the voice signal. The vibration of the cover panel 2 is transmitted as a voice to the user when the user moves the cover panel 2 close to an ear. The piezoelectric vibrator that replaces the receiver 160 eliminates the need for the receiver hole 16.

The battery 230 can output a power source for the electronic apparatus 1. The battery 230 is, for example, a rechargeable battery such as a lithium-ion secondary battery. The battery 210 can supply a power source to the various electronic parts such as the controller 100 and the wireless communication unit 110 of the electronic apparatus 1.

The first imaging apparatus 180 and the second imaging apparatus 190 each include the lens and an image sensor. The controller 100 controls the first imaging apparatus 180. The first imaging apparatus 180 can receive light through the first lens transparent member 18 and the lens with the image sensor, generate a captured image, and then output the captured image to the controller 100. The controller 100 controls the second imaging apparatus 190. The second imaging apparatus 190 can receive light through the second lens transparent member 19 and the lens with the image sensor, generate a captured image, and then output the captured image to the controller 100. The captured image may be a still image. Alternatively, the first imaging apparatus 180 and the second imaging apparatus 190 may repeatedly (periodically) generate the captured image to generate a video.

The controller 100 may generate a panoramic image based on a plurality of captured images. The panoramic image is wider than a photographic range of the imaging apparatus and is generated based on the plurality of captured images, which are generated consecutively. For example, the user performs imaging while moving the electronic apparatus 1 in one direction, and thus the imaging apparatus (the first imaging apparatus 180 or the second imaging apparatus 190) generates a plurality of captured images. The controller 100 combines the plurality of captured images into a panoramic image and generates the panoramic image elongated in the one direction. Any other steps may be used for the panoramic composition. For example, while common imaged portions extracted from each of two consecutive captured images have coordinates appropriately converted so as to coincide with each other, the two consecutive captured images are combined together. This process is performed consecutively on a plurality of captured images in chronological order, and thus a panoramic image can be generated.

The controller 100 can store still images, panoramic images, or videos in the nonvolatile memory (flash memory) or a volatile memory (RAM) in the storage medium 103.

The lens of the second imaging apparatus 190 can be visually recognized from the second lens transparent member 19 located in the cover panel 2. The second imaging apparatus 190 can thus image an object located on the cover panel 2 side of the electronic apparatus 1 or on the front surface 1a side of the electronic apparatus 1. The second imaging apparatus 190 may be referred to as an "in-camera".

The lens of the first imaging apparatus 180 can be visually recognized from the first lens transparent member 18 located in the back surface 1b of the electronic apparatus 1. The first imaging apparatus 180 can thus image an object located on the back surface 1b side of the electronic apparatus 1. The first imaging apparatus 180 may be referred to as an "out-camera".

The underwater sensor 200 can detect an underwater state in which at least part of the exterior 4 of the electronic apparatus 1 is located in the water and an above-water state in which the at least part of the exterior 4 is not located in the water. The underwater state may be caused by, for example, the user who holds the electronic apparatus 1 in his/her hand and puts the electronic apparatus 1 in the water. Underwater photography with the first imaging apparatus 180 or the second imaging apparatus 190 of the electronic apparatus 1 is assumed for the purpose of putting the electronic apparatus 1 in the water.

Figure 4:
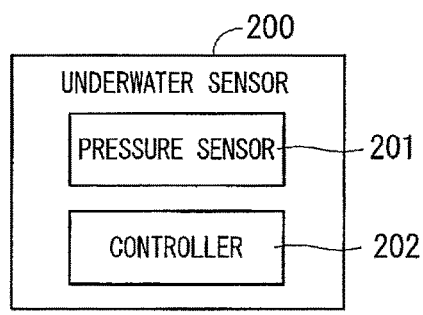
FIG. 4 illustrates a view schematically showing one example of an internal configuration of an underwater sensor.

FIG. 4 illustrates a view schematically showing one example of an internal configuration of the underwater sensor 200. In FIG. 4, the underwater sensor 200 includes, for example, a pressure sensor 201 and a controller 202. For example, the pressure sensor 201 measures pressure of gas or liquid with a pressure sensitive element with a stainless diaphragm or a silicon diaphragm therebetween, converts the measured value into an electrical signal, and outputs the signal to the controller 202. The controller 202 recognizes the pressure value based on the electrical signal received from the pressure sensor 201. The controller 202 can detect the underwater state and the above-water state according to the pressure value. Specifically, the controller 202 will detect, for example, the underwater state at the pressure value that exceeds a predetermined threshold value and detect the above-water state at the pressure value that falls short of the predetermined threshold value. For example, the predetermined threshold value may be appropriately set to a pressure value previously measured when the pressure sensor 201 is located in the water. The functions of the controller 202 may be achieved by the controller 100. In this case, the pressure sensor 201 outputs the pressure value to the controller 100.

The underwater sensor 200 may include, for example, a sensor capable of detecting capacitance and a controller (such as the controller 100). The sensor capable of detecting capacitance measures a capacitance between an object and itself, converts the measured value of the capacitance into an electrical signal, and outputs the signal to the controller 100. The controller 100 recognizes the value of the capacitance based on the electrical signal received from the sensor capable of detecting capacitance. The controller 100 detects the underwater state and the above-water state according to the measured value of the capacitance, for example. The controller 100 will detect the underwater state at the measured value of the capacitance that exceeds a predetermined threshold value and detect the above-water state at the measured value of the capacitance that falls short of the predetermined threshold value, for example. For example, the predetermined threshold value may be appropriately set to a value of capacitance previously measured when the sensor is located in the water. The sensor capable of detecting capacitance is, for example, a touch sensor. The touch panel 130 may be used as the sensor capable of detecting capacitance. The underwater sensor 200 may include the pressure sensor, the sensor capable of detecting capacitance, and the controller (such as the controller 100).

Hereinafter, one example of the underwater sensor 200 that includes the pressure sensor 201 is described.

The acceleration sensor 210 can detect acceleration of the electronic apparatus 1, convert the detected value of the acceleration into an electrical signal, and output the signal to the controller 100. For example, the acceleration sensor 210 can detect the acceleration on the basis of a capacitive method, a piezoresistive method, or a heat detection method. The acceleration sensor 210 detects, for example, acceleration components of X, Y, Z axes substantially orthogonal to one another. The controller 100 recognizes the value of the acceleration based on the electrical signal received from the acceleration sensor 210. The controller 100 can obtain a spatial inclination of the electronic apparatus 1 (exterior 4) with respect to a reference plane according to the value of the acceleration. For example, the inclination of the electronic apparatus 1 can be represented by an angle, which will be described next. First, coordinates are described. A short-side direction of the electronic apparatus 1 in a plan view is set to the X axis, for example, and a long-side direction of the electronic apparatus 1 in the plan view is set to the Y axis, for example. A normal direction of the electronic apparatus 1 is set to the Z axis. The inclination of the electronic apparatus 1 can be represented by a rotation angle about the X axis and a rotation angle about the Y axis from, for example, the state where X, Y planes coincide with a predetermined reference plane (such as a ground) or the state where the electronic apparatus 1 is placed horizontally. The acceleration of gravity always acts in the vertical direction, so that the controller 100 can obtain the inclination of the electronic apparatus 1 by detecting the acceleration in the three directions.

The electronic apparatus 1 may include another inclination sensor that detects the inclination of the electronic apparatus 1. For example, the electronic apparatus 1 may include, for example, a gyro sensor as the inclination sensor. The gyro sensor such as a vibrating gyro sensor detects angular velocity corresponding to the rotation of the electronic apparatus 1. The gyro sensor converts the detected value of the angular velocity into an electrical signal and outputs the signal to the controller 100. The controller 100 recognizes the value of the angular velocity based on the electrical signal received from the gyro sensor. The controller 100 obtains the inclination of the electronic apparatus 1 based on an integral of the angular velocity. The electronic apparatus 1 may include both of the acceleration sensor 210 and the gyro sensor to improve the accuracy.

The electronic apparatus 1 may also include, for example, a geomagnetic sensor. The geomagnetic sensor can detect geomagnetism. For example, the geomagnetic sensor may include a hole device in which electromotive force occurs according to a magnetic field. The geomagnetic sensor detects geomagnetism based on the electromotive force occurring in the hole device. For example, the geomagnetic sensor can detect geomagnetic components of the X, Y, Z axes orthogonal to one another. The north pole functions as the S-pole and the south pole functions as the N-pole, so that the inclination of the electronic apparatus 1 can be detected based on the detected geomagnetic components. The electronic apparatus 1 may include at least two of the acceleration sensor 210, the gyro sensor, and the geomagnetic sensor to improve the accuracy.

The user, may move the electronic apparatus 1 spatially. For example, the user may perform imaging while moving the electronic apparatus 1. The movement causes the acceleration of the electronic apparatus 1. The controller 100 can also obtain movement speed of the electronic apparatus 1 based on the acceleration of the electronic apparatus 1. For example, the controller 100 can obtain the movement speed based on a time integral of the acceleration of the controller 100.

<Above-Water Photography and Underwater Photography>

In one embodiment, it is assumed that the user performs imaging while moving the electronic apparatus 1 spatially. For a more specific example, the user performs imaging while moving the electronic apparatus 1 from above the water into the water and vice versa. In other words, the user continuously performs the above-water photography and the underwater photography.

Figure 6:
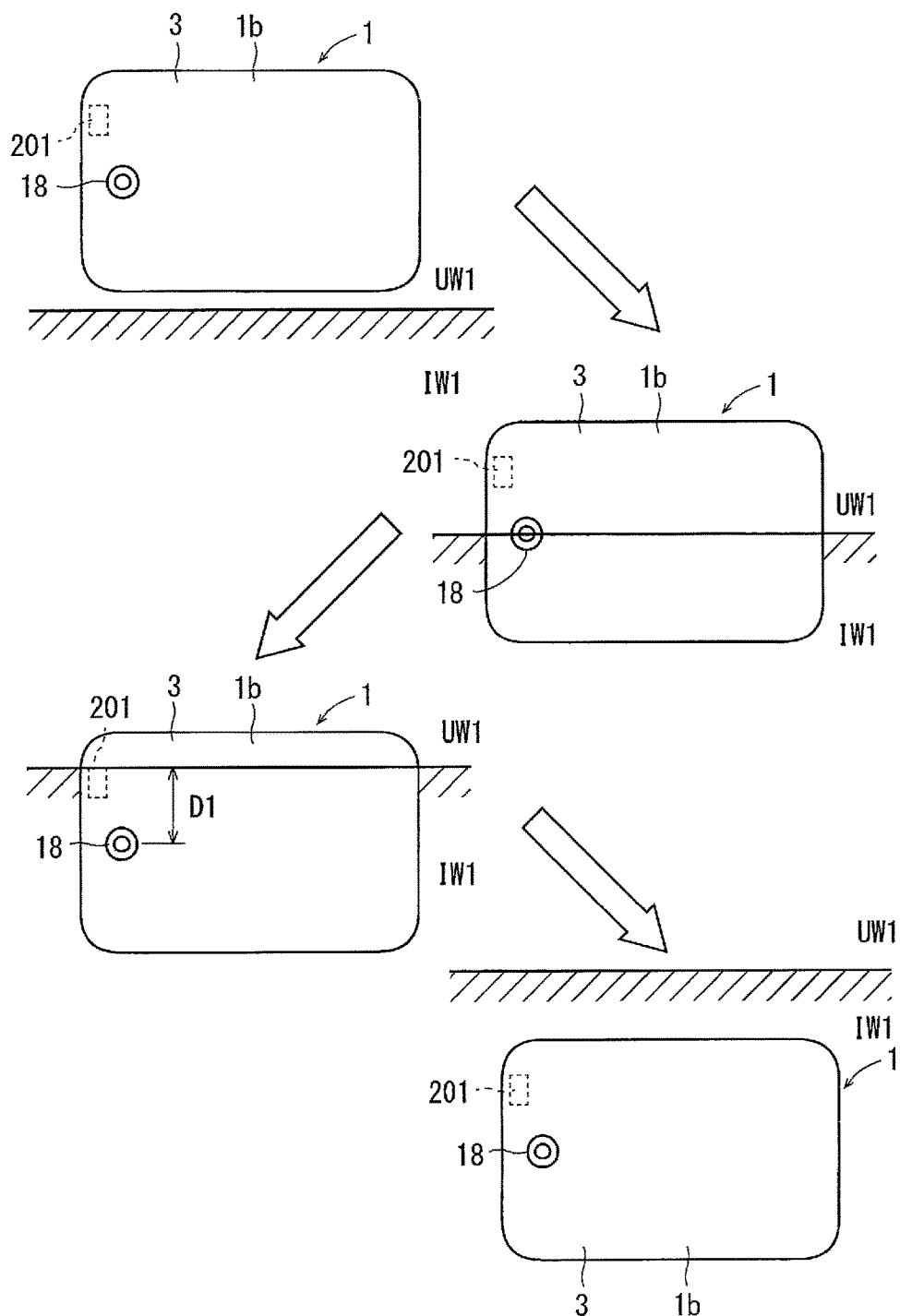
FIG. 6 illustrates a view schematically showing one example of how imaging is performed while the electronic apparatus is moved.

FIGS. 5 and 6 illustrate views schematically showing one example of how imaging is performed while the electronic apparatus 1 is moved from above the water into the water. FIGS. 5 and 6 schematically illustrate an above-water region UW1 and an underwater region IW1. FIG. 7 illustrates a view schematically showing one example of captured images generated by imaging in FIGS. 5 and 6. FIG. 7 also illustrates one example of detection results of the underwater sensor 200. The first imaging apparatus 180 or the second imaging apparatus 190 may be used for capturing the images, but the first imaging apparatus 180 is mainly used in the following descriptions.

In one example of FIG. 5, the electronic apparatus 1 is retained in such a position that the long-side direction of the electronic apparatus 1 in the plan view is in the vertical direction and the first lens transparent member 18 is located in the upper portion of the electronic apparatus 1. In FIG. 5, the pressure sensor 201 is located at the upper right with respect to the first lens transparent member 18, for example.

In the upper left state of FIG. 5, the first lens transparent member 18 is located above the water. The position of the first lens transparent member 18 may be regarded as the position of the first imaging apparatus 180. Thus, the position of the first lens transparent member 18 may be described below as the position of the first imaging apparatus 180, for example. When the first lens transparent member 18 is located above the water, the first imaging apparatus 180 images a scene above the water. In other words, the captured image generated at this time is an above-water image FU1 of the scene above the water (also see FIG. 7).

The user moves the electronic apparatus 1 in the above-mentioned position into the water, but the scene above the water is captured and the above-water image FU1 is repeatedly generated while the first lens transparent member 18 is located above the water. Also in the upper left state of FIG. 5, the pressure sensor 201 is also located above the water. Thus, the underwater sensor 200 detects the above-water state. Therefore, as illustrated in FIG. 7, the underwater sensor 200 initially detects the above-water state while the first imaging apparatus 180 generates the above-water images FU1.

In the upper right state of FIG. 5, the first lens transparent member 18 has reached the water surface. In other words, the first imaging apparatus 180 has reached the water surface. At this time, the first imaging apparatus 180 images the water surface. Thus, the captured image generated at this time is a water surface image FW1 (also see a water surface timing t1 in FIG. 7). Also in this state, the pressure sensor 201 is located above the water, so that the underwater sensor 200 detects the above-water state without detecting the underwater state.

The user then moves the electronic apparatus 1 into the water more deeply. Thus, the first lens transparent member 18 (namely, the first imaging apparatus 180) soaks underwater. Subsequently, the first imaging apparatus 180 repeatedly generates an underwater image FD1 of an underwater scene. In the lower left state of FIG. 5, the pressure sensor 201 soaks underwater. At this time, the pressure value detected by the pressure sensor 201 exceeds the threshold value. In other words, the pressure value changes from a value smaller than the threshold value to a value greater than the threshold value. Thus, the underwater sensor 200 detects the underwater state at this time. In other words, the detection results of the underwater sensor 200 change from the above-water state to the underwater state (also see a transition timing t2 in FIG. 7).

The user then moves the electronic apparatus 1 into the water more deeply. In the lower right state of FIG. 5, the pressure sensor 201 and the first lens transparent member 18 both soak underwater, so that the underwater sensor 200 continues to detect the underwater state while the first imaging apparatus 180 repeatedly generates the underwater image FD1.

As described above, the transition timing t2 at which the underwater sensor 200 detects the underwater state from the above-water state is different from the water surface timing t1 at which the first lens transparent member 18 reaches the water surface.

The inclination of the electronic apparatus 1 in one example of FIG. 6 is different from that in FIG. 5. In one example of FIG. 6, the long-side direction of the electronic apparatus 1 is in the horizontal direction and the pressure sensor 201 is located above the first lens transparent member 18. In FIG. 6 similar to FIG. 5, the first lens transparent member 18 moves from above the water into the water via the water surface, so that the first imaging apparatus 180 generates the above-water image FU1, the water surface image FW1, and the underwater image FD1 in the stated order. Also in one example of FIG. 6, the pressure sensor 201 is located above the water when the first lens transparent member 18 (namely, the first imaging apparatus 180) has reached the water surface (see the second state from the top of FIG. 6). In other words, as illustrated in FIG. 7, the underwater sensor 200 detects the above-water state at the water surface timing t1. Subsequently, the pressure sensor 201 soaks underwater in the third state from the top of FIG. 6. Thus, the detection results of the underwater sensor 200 change from the above-water state to the underwater state at the transition timing t2 after the water surface timing t1.

As described above, in the cases of FIGS. 5 and 6, the transition timing t2 comes after the water surface timing t1. It should be noted that a period T1 between the water surface timing t1 and the transition timing t2 may be different between FIGS. 5 and 6. The reason is that the movement distance of the electronic apparatus 1 from the water surface timing t1 to the transition timing t2 is different between FIGS. 5 and 6. In other words, the reason is that a distance D1 between the center of the first lens transparent member 18 and the water surface at the transition timing t2 is different between FIGS. 5 and 6. For example, the distance D1 illustrated in FIG. 5 is shorter than that in FIG. 6. Thus, the period T1 between the water surface timing t1 and the transition timing t2 is longer in FIG. 6 than that in FIG. 5 on the assumption that the movement speed of the electronic apparatus 1 is equal. In other words, it can also be described that the period T1 depends on the inclination of the electronic apparatus 1 since the distance D1 differs according to the inclination of the electronic apparatus 1.

The period T1 can also be simply represented by the quotient of the distance D1 divided by the movement speed of the electronic apparatus 1 that increases with the shorter period T1.

Figure 8:
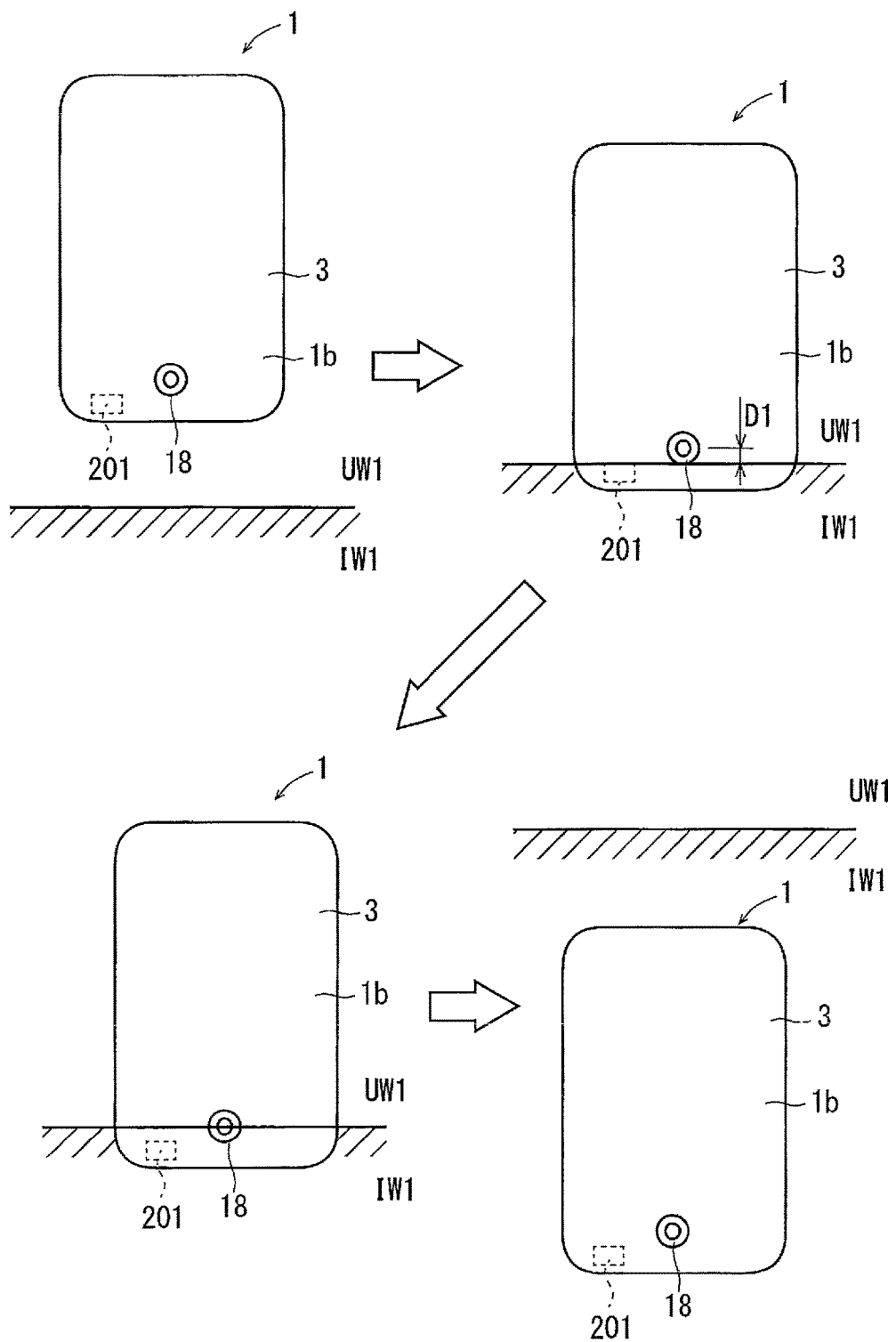
FIG. 8 illustrates a view schematically showing one example of how imaging is performed while the electronic apparatus is moved.
Figure 9:
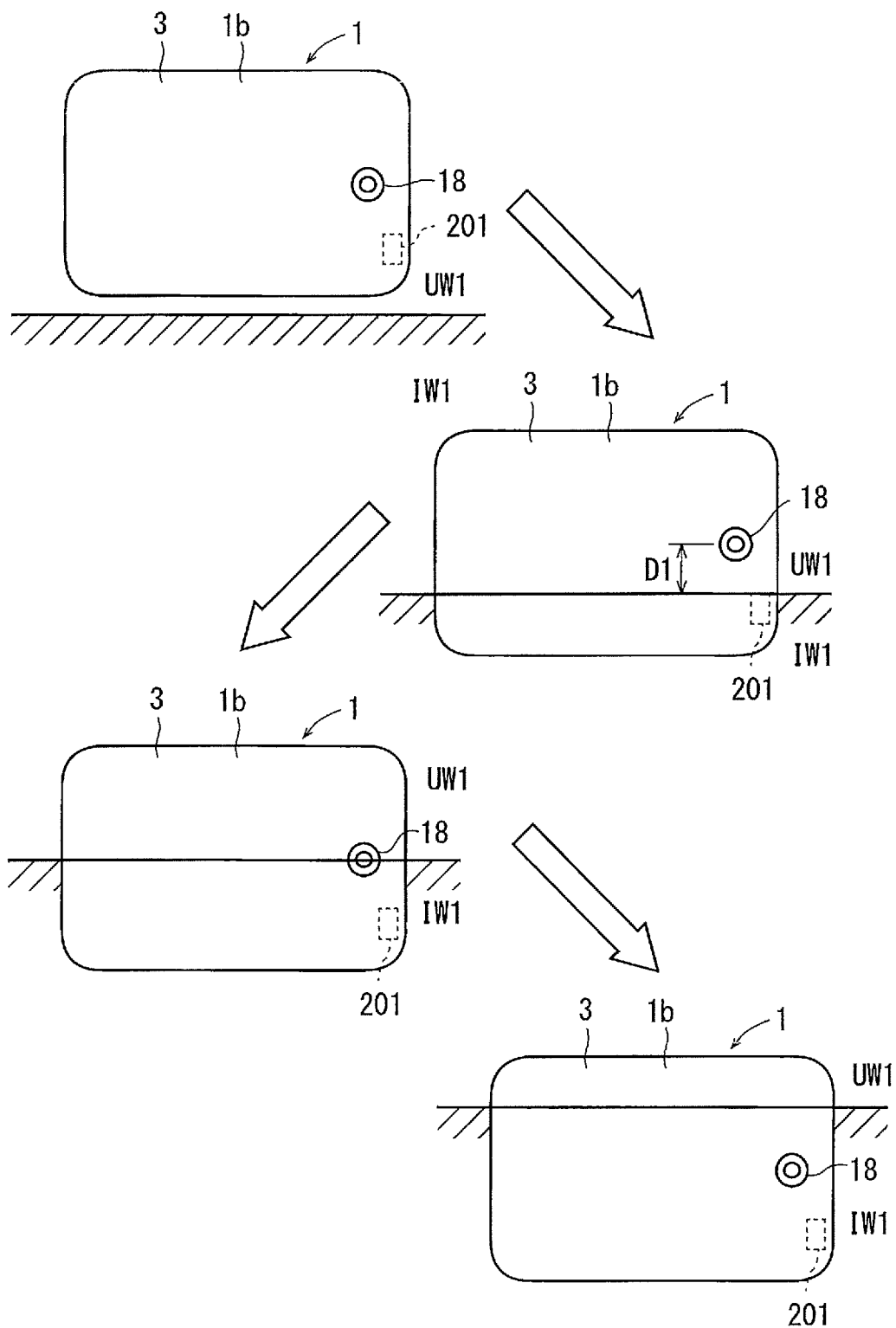
FIG. 9 illustrates a view schematically showing one example of how imaging is performed while the electronic apparatus is moved.
Figure 10:
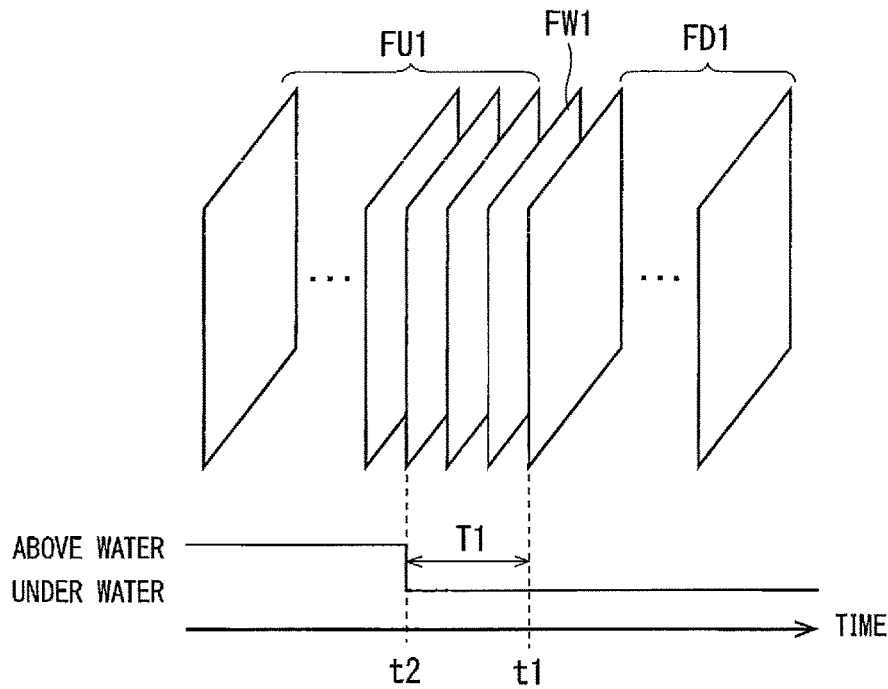
FIG. 10 illustrates a view schematically showing one example of captured images generated by imaging.

FIGS. 8 and 9 illustrate views schematically showing one example of how imaging is performed while the electronic apparatus 1 is moved from above the water into the water. FIG. 10 illustrates a view schematically showing one example of captured images generated by imaging in FIGS. 8 and 9. The inclination of the electronic apparatus 1 in FIGS. 8 and 9 is different from that in FIGS. 5 and 6.

In one example of FIG. 8, the long-side direction of the electronic apparatus 1 is in the vertical direction similarly to FIG. 5, but the pressure sensor 201 is located below the first lens transparent member 18. In one example of FIG. 9, the long-side direction of the electronic apparatus 1 is in the horizontal direction similarly to FIG. 6, but the pressure sensor 201 is located below the first lens transparent member 18. Therefore, at the inclinations of the electronic apparatus 1, the first lens transparent member 18 is located above the water when the pressure sensor 201 soaks underwater (see the second states in FIGS. 8 and 9). Thus, the first imaging apparatus 180 generates the above-water image FU1 at the transition timing t2 at which the detection results of the underwater sensor 200 change from the above-water state to the underwater state (see FIG. 10). Subsequently, the first imaging apparatus 180 continues to image the scene above the water even though the underwater sensor 200 detects the underwater state until the first lens transparent member 18 reaches the water surface. In other words, the first imaging apparatus 180 continues to generate the above-water images FU1. When the first lens transparent member 18 reaches the water surface, the first imaging apparatus 180 generates the water surface image FW1. The first lens transparent member 18 is then moved into the water more deeply, and the first imaging apparatus 180 generates the underwater images FD1.

As described above, the water timing t1 is different from the transition timing t2 also in FIGS. 8 and 9. It should be noted that the water surface timing t1 comes after the transition timing t2 in FIGS. 8 to 10.

Therefore, it is difficult to identify the water surface image FW1 generated at the water surface timing t1 only with reference to the detection results of the underwater sensor 200. One embodiment is thus designed to identify the water surface image FW1 with high accuracy. The specific description will be given below.

<One Example of Configuration and Actions of Controller>

Figure 11:
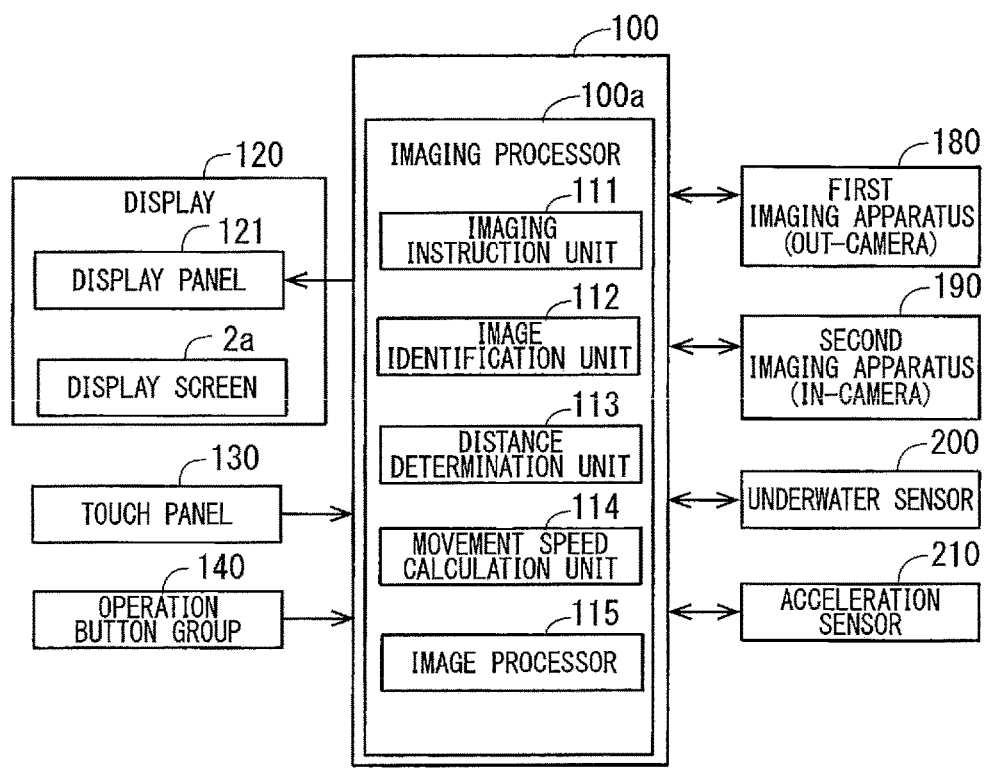
FIG. 11 illustrates a functional block diagram schematically showing one example of an internal configuration of a controller.

FIG. 11 illustrates a functional block diagram schematically showing one example of an internal configuration of the controller 100. The controller 100 includes an imaging processor 100a.

The imaging processor 100a can process imaging with the first imaging apparatus 180 and the second imaging apparatus 190. The imaging processor 100a can process imaging by, for example, reading and executing the application stored in the storage medium 103.

The imaging processor 100a includes, for example, an imaging instruction unit 111, an image identification unit 112, and an image processor 115.

The imaging instruction unit 111 can provide instructions to the first imaging apparatus 180 and the second imaging apparatus 190 based on an input by the user. The input may be performed with, for example, the touch panel 130 or the operation button group 140. Specific examples of kinds of the input include a specification of an imaging apparatus (the first imaging apparatus 180 or the second imaging apparatus 190), a specification of a kind of imaging (a still image, a panoramic image, and a video), and a specification of imaging timing (shutter timing for the still image, and start timing or termination timing of imaging for the panoramic image and the video).

The image instruction unit 111 can provide instructions for the kind of imaging and the imaging timing to the imaging apparatus specified by the user. The imaging apparatus that has received instructions can perform imaging based on the instructions. For example, the user specifies the first imaging apparatus 180 and the panoramic image as the kind of imaging and then provides instructions for start of imaging while the electronic apparatus 1 is located above the water. In response to the input by the user, the imaging instruction unit 111 instructs the first imaging apparatus 180 to start capturing a panoramic image. In response to the instructions, the first imaging apparatus 180 starts imaging, repeatedly generates the captured image, and outputs the captured images to the controller 100. Further, the user moves the electronic apparatus 1 into the water and provides instructions for termination of imaging in the water. In response to the termination instructions by the user, the image instruction unit 111 instructs the first imaging apparatus 180 to end imaging. The first imaging apparatus 180 ends imaging in response to the instructions. Thus, the plurality of captured images, which are the original of the panoramic image, can be obtained.

The image identification unit 112 can identify the water surface image FW1 among the plurality of captured images based on the detection results of the underwater sensor 200 and of the acceleration sensor 210. First, the concept of the identification will be generally described, and specific examples of the identification method will be described later.

As described above, the period T1 between the water surface timing t1 and the transition timing t2 depends on the distance D1 (namely, the inclination of the electronic apparatus 1) and the movement speed of the electronic apparatus 1. The inclination and the movement speed of the electronic apparatus 1 can be obtained based on the detection results of the acceleration sensor 210. Therefore, the image identification unit 112 can obtain the period T1 based on the detection results of the acceleration sensor 210.

Also as described above, whether the water surface timing t1 comes before or after the transition timing t2 depends on the inclination of the electronic apparatus 1. Thus, the image identification unit 112 can determine whether the water surface timing t1 comes before or after the transition timing t2 based on the detection results of the acceleration sensor 210.

Therefore, the image identification unit 112 can obtain the water surface timing t1 based on the detection results of the underwater sensor 200 and of the acceleration sensor 210, and can identify the water surface image FW1 based on the water surface timing t1. The water surface timing t1 can be more accurately identified by not only the detection results of the underwater sensor 200 but also the detection results of the acceleration sensor 210 in the manner described above. The specific examples of the identification method are described below.

<Specific Examples of Method for Identifying Water Surface Image>

The period T1 can be obtained based on a movement speed V1 and the movement distance (the distance D1) of the electronic apparatus 1 in the period T1. First, the distance D1 and the movement speed V1 are obtained. In one example of FIG. 11, the imaging processor 100a further includes a distance determination unit 113 and a movement speed calculation unit 114.

The distance determination unit 113 can obtain the distance D1 based on the inclination of the electronic apparatus 1 at the transition timing t2. The distance D1 depends on the inclination of the electronic apparatus 1 as described above. The correspondence between the distance D1 and the inclination of the electronic apparatus 1 can be previously obtained by, for example, experiment or simulation. The correspondence is previously stored in the storage medium (such as the storage medium 103).

The distance determination unit 113 obtains the inclination of the electronic apparatus 1 when the detection results of the underwater sensor 200 change from the above-water state to the underwater state (namely, the inclination of the electronic apparatus 1 at the transition timing t2) based on the acceleration. The distance determination unit 113 may obtain the inclination of the electronic apparatus 1 based on not only the detection results of the acceleration sensor 210 but also the detection results of at least one of the acceleration sensor 210, the gyro sensor, or the geomagnetic sensor. The distance determination unit 113 determines the distance D1 based on the obtained inclination and the correspondence stored in the storage medium and outputs the distance D1 to the image identification unit 112.

In most cases, the user rarely changes the inclination of the electronic apparatus 1 when moving it during imaging to generate a panoramic image. The user's input of the start instructions for panoramic imaging triggers the distance determination unit 113 to obtain the inclination of the electronic apparatus 1 that may be regarded as the inclination of the electronic apparatus 1 at the transition timing t2.

The movement speed calculation unit 114 can calculate the movement speed V1 of the electronic apparatus 1 based on the acceleration detected by the acceleration sensor 210. For example, the movement speed calculation unit 114 integrates the acceleration to calculate the movement speed V1. It is assumed here that the movement speed V1 is constant in the period T1. In this case, it can be assumed that the movement speed V1 at the transition timing t2 is the movement speed V1 in the period T1. Thus, the movement speed calculation unit 114 outputs the movement speed V1 calculated at the transition timing t2 to the image identification unit 112.

The image identification unit 112 calculates the period T1 based on the distance D1 and the movement speed V1. For example, the image identification unit 112 divides the distance D1 by the movement speed V1 to calculate the period T1.

The image identification unit 112 then determines whether the water surface timing t1 comes before or after the transition timing t2 based on the inclination of the electronic apparatus 1. For example, the correspondence between the information whether the water surface timing t1 comes before or after the transition timing t2 and the inclination of the electronic apparatus 1 is previously stored in the storage medium (such as the storage medium 103). The image identification unit 112 determines whether the transition timing t2 comes before or after the water surface timing t1 based on the inclination of the electronic apparatus 1 at the transition timing t2 and the correspondence stored in the storage medium. For example, if the inclination of the electronic apparatus 1 is the inclination in FIG. 5, the image identification unit 112 determines that the water surface timing t1 comes before the transition timing t2.

If it is determined that the water surface timing t1 comes before the transition timing t2, the image identification unit 112 subtracts the calculated period T1 from the transition timing t2 to calculate the water surface timing t1. If it is determined that the water surface timing t1 comes after the transition timing t2, the image identification unit 112 adds the calculated period T1 to the transition timing t2 to calculate the water surface timing t1. The image identification unit 112 identifies the captured image captured at the closest timing to the water surface timing t1 as the water surface image.

As described above, the electronic apparatus 1 identifies the water surface image by not only the detection results of the underwater sensor 200 but also the detection results of the acceleration sensor 210. Therefore, the water surface image can be identified with high accuracy. In other words, the captured image generated at the timing close to the water surface timing t1 at which the actual water surface image FW1 is generated can be identified as the water surface image. The identified water surface image ideally coincides with the actual water surface image FW1. At the same time, the identified water surface image may be different from the water surface image FW1 due to a detection error of the sensor. Thus, the identified water surface image may also be referred to as a water surface image FW2 below.

The image identification unit 112 may appropriately identify, as the above-water images and the underwater images, captured images captured before and after the identified water surface image FW2, which serves as a boundary. For initial detection of the above-water state, for example, the captured images before the identified water surface image FW2 may be identified as the above-water images while the captured images after the identified water surface image FW2 may be identified as the underwater images. As described above, the water surface image FW2 can be identified with high accuracy, allowing the captured images to be categorized as the above-water images and the underwater images with high accuracy. Hereinafter, the identified above-water images and the identified underwater images may also be referred to as above-water images FU2 and underwater images FD2.

Such a configuration allows image processing suitable above the water and image processing suitable in the water to be more appropriately performed on the above-water images FU2 and the underwater images FD2, respectively. In other words, such a configuration can reduce the underwater image processing performed on the captured images, which are originally the above-water images FU1 and mistakenly identified as the underwater images FD2, and reduce the above-water image processing performed on the captured images, which are originally the underwater images FD1 and mistakenly identified as the above-water images FU2.

The image processor 115 can generate the panoramic image based on the captured images. Various types of image processing can be performed on the captured images. For example, image processing for above-water images can be performed on the above-water images FU2, or image processing for underwater images can be performed on the underwater images FD2. Specific examples of the image processing will be described below in detail.

<One Example of Specific Actions of Electronic Apparatus 1>

Figure 12:
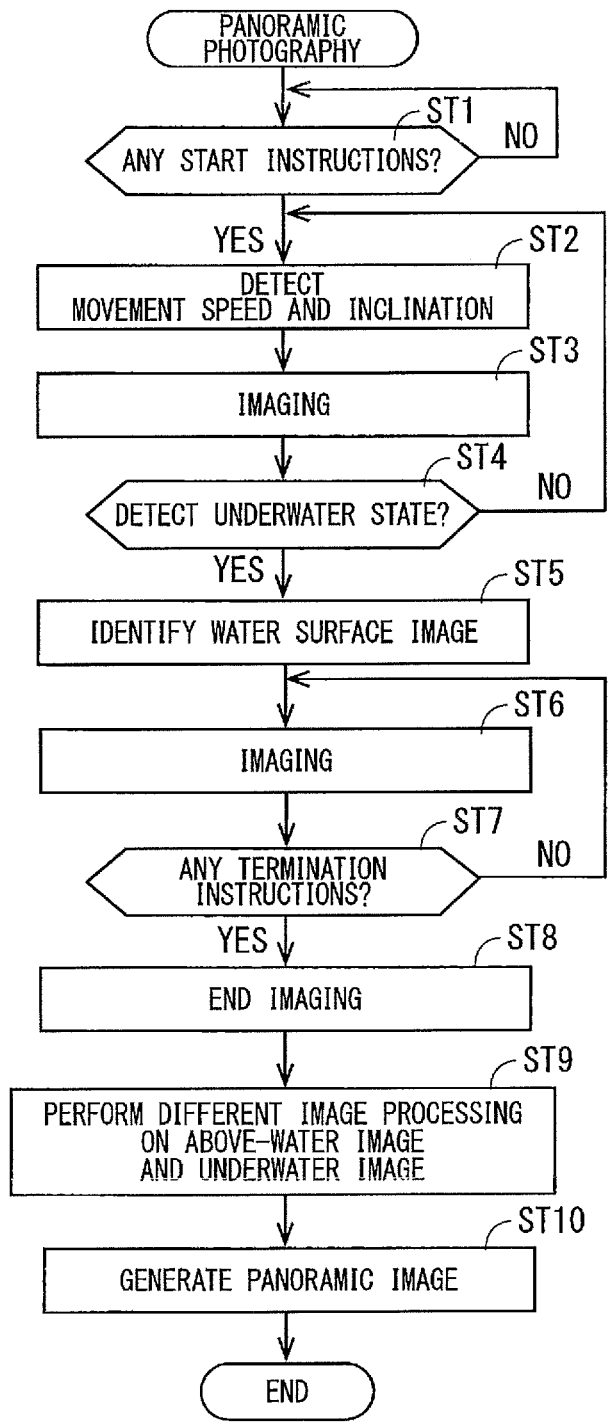
FIG. 12 illustrates a flowchart showing one example of specific actions of an imaging processor.

FIG. 12 illustrates a flowchart showing one example of specific actions of the imaging processor 100a. FIG. 12 illustrates one example of the action when the user performs panoramic photography while moving the electronic apparatus 1 from above the water into the water. First, the imaging instruction unit 111 determines whether the user has input the start instructions for the panoramic photography in Step ST1. For a plurality of imaging apparatuses, the user may also input a specification of an imaging apparatus with the start instructions. If the imaging instruction unit 111 determines that the start instructions for the panoramic photography have not been input, the imaging instruction unit 111 executes Step ST1 again. If the imaging instruction unit 111 determines that the start instructions for the panoramic photography have been input, the distance determination unit 113 detects the inclination of the electronic apparatus 1 and the movement speed calculation unit 114 calculates the movement speed of the electronic apparatus 1 in Step ST2.

In Step ST3, the imaging instruction unit 111 then outputs the instructions for start of imaging to, for example, the first imaging apparatus 180. The first imaging apparatus 180 performs imaging in response to the instructions and generates a captured image. The generated captured image is output to the imaging processor 100a. In addition, Steps ST2 and ST3 may be executed in the reverse order or executed simultaneously.

The image identification unit 112 then determines whether the detection results of the underwater sensor 200 have changed from the above-water state to the underwater state in Step ST4. If a negative determination is made, the imaging processor 100a executes Step ST2 again. The imaging instruction unit 111 may not output the instructions in every Step ST3 that is repeatedly performed. For example, once the first imaging apparatus 180 has received the instructions for start of imaging, the first imaging apparatus 180 may repeat imaging until the first imaging apparatus 180 receives the instructions for termination of imaging, which will be described later, from the imaging instruction unit 111.

If a positive determination is made in Step ST4, that is to say, if it is determined that the detection results of the underwater sensor 200 have changed from the above-water state to the underwater state, the image identification unit 112 identifies the water surface image FW2 as described above in Step ST5.

The first imaging apparatus 180 then performs imaging in Step ST6. The imaging instruction unit 111 then determines whether the user has input the termination instructions for the panoramic photography in Step ST7. If it is determined that the termination instructions for the panoramic photography have not been input, the first imaging apparatus 180 executes Step ST6 again. If it is determined that the termination instructions for the panoramic photography have been input, the imaging instruction unit 111 instructs, for example, the first imaging apparatus 180 to end imaging in Step ST8. The first imaging apparatus 180 ends imaging in response to the instructions. In Step ST9, the image identification unit 112 then categorizes the generated captured images as the above-water images FU2 and the underwater images FD2, and the image processor 115 performs different image processing on, for example, the above-water images FU2 and the underwater images FD2. The specific examples of the image processing will be described later. In Step ST10, the image processor 115 then generates the panoramic image based on the captured images after the image processing.

Step ST10 may be executed without the image processing in Step ST9. As described below, different image processing may be performed on the above-water region of the above-water scene and the underwater region of the underwater scene in the panoramic image.

Figure 13:
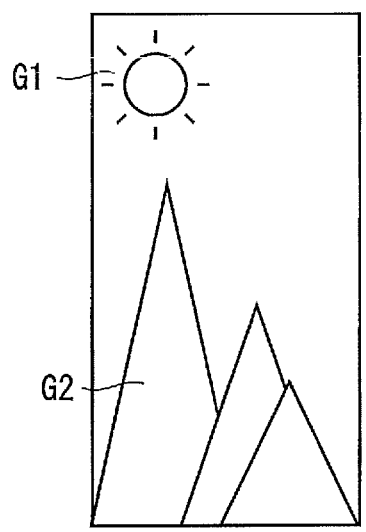
FIG. 13 illustrates a view schematically showing one example of a captured image generated first in panoramic photography.
Figure 14:
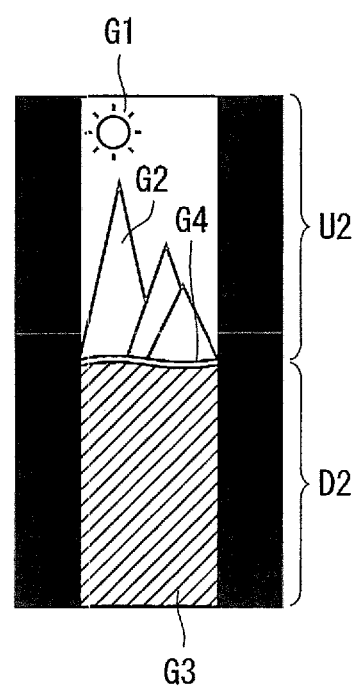
FIG. 14 illustrates a view schematically showing one example of a panoramic image.

FIG. 13 illustrates a view schematically showing one example of a captured image generated first in the panoramic photography. In one example of FIG. 13, the sun G1 and a mountain G2 are imaged in the captured image. In FIG. 13, the base of the mountain G2 is imaged at the lowest end of the captured image. Then, the user moves, for example, the electronic apparatus 1 into the water in the vertical direction and ends the panoramic photography in the water. Thus, a panoramic image is generated. FIG. 14 illustrates a view schematically showing one example of the panoramic image. A scene longer in the vertical direction than the captured image of FIG. 13 is imaged in the panoramic image. For example, an underwater scene G3 below the sun G1 and the mountain G2 is imaged in the panoramic image.

In one example of FIGS. 13 and 14, the images have the same height in the vertical direction while the panoramic image has a narrower width in the horizontal direction. In FIG. 14, the panoramic image displays no scene at both ends and displays a predetermined color (such as black) at both sides, for example.

<Movement Direction of Electronic Apparatus>

In the specific examples described above, the user performs imaging while moving the electronic apparatus 1 from above the water into the water. This is not, however, a restrictive requirement, and the user may move the electronic apparatus 1 from the water to above the water. In this case, FIGS. 5 to 10 may be interpreted in reverse chronological order. In other words, the movement of the electronic apparatus 1 may be interpreted by reversing the block arrows in FIGS. 5, 6, 8, and 9 while the captured images and the detection results of the underwater sensor 200 may be interpreted by reversing the arrow of the temporal axis in FIGS. 7 and 10.

In this case, the water surface timing t1 comes after the transition timing t2 in one example of FIGS. 5 to 7, and the water surface timing t1 comes before the transition timing t2 in one example of FIGS. 8 to 10. In other words, whether the water surface timing t1 comes before or after the transition timing t2 depends on not only the inclination of the electronic apparatus 1 but also the movement direction of the electronic apparatus 1. Table 1 indicates the inclination of the electronic apparatus 1, the detection results of the underwater sensor 200, and the relationship between the water surface timing t1 and the transition timing t2.

TABLE 1

| | | |
|---|---|---|
| t1 < t2 | UP | ABOVE WATER → UNDER WATER |
| | LEFT | ABOVE WATER → UNDER WATER |
| | DOWN | UNDER WATER → ABOVE WATER |
| | RIGHT | UNDER WATER → ABOVE WATER |
| t1 > t2 | DOWN | ABOVE WATER → UNDER WATER |
| | RIGHT | ABOVE WATER → UNDER WATER |
| | UP | UNDER WATER → ABOVE WATER |
| | LEFT | UNDER WATER → ABOVE WATER |

Table 1 indicates the inclinations in FIGS. 5, 6, 8, and 9 respectively by "up", "left", "down", and "right". Table 1 also indicates the change from the above-water state to the underwater state in the detection results of the underwater sensor 200 by "above water→under water", and indicates the change from the underwater state to the above-water state in the detection results by "under water→above water".

The movement direction of the electronic apparatus 1 can be determined based on the detection results of the underwater sensor 200. For example, the change from the underwater state to the above-water state in the detection results of the underwater sensor 200 makes it clear that the electronic apparatus 1 is moving from the water to above the water.

The image identification unit 112 may determine whether the water surface timing t1 comes before or after the transition timing t2 based on the inclination of the electronic apparatus 1 at the transition timing t2 and the transition direction (namely, the movement direction of the electronic apparatus 1). For example, if the inclination of the electronic apparatus 1 is "up" and the detection results of the underwater sensor 200 change from the above-water state to the underwater state, it can be determined that the water surface timing t1 comes before the transition timing t2. Thus, the water surface image FW2 can be appropriately identified according to the movement direction of the electronic apparatus 1.

The electronic apparatus 1, which is often moved in only one direction in the panoramic photography, is also often moved in multiple directions in the video recording. For example, the user sometimes repeatedly moves the electronic apparatus 1 alternately from above the water into the water and vice versa to record a video. The image identification unit 112 may identify the water surface image FW2 based on the detection results of the underwater sensor 200 and the acceleration sensor 210 every time the detection results of the underwater sensor 200 change. Thus, the image identification unit 112 can identify the above-water image FU1 and the underwater image FD1, which are alternately repeatedly generated, with high accuracy. The electronic apparatus 1 may also be moved in multiple directions in the panoramic photography.

<Specific Examples of Image Processing>
<First Correction Example of Brightness>

It is darker in the water than above the water. For this reason, the image processor 115 may perform image processing for improving brightness on the underwater image FD2. Lightness, for example, may be used as the parameter indicating the brightness. In this case, the image processor 115 may increase at least values of maximum components or minimum components among red components, blue components, and green components in each pixel of the underwater image FD2. This allows improved lightness of the underwater image FD2. An amount of increase in the values may be equal in all the pixels of the underwater image FD2. In other words, the overall lightness of the underwater image FD2 may be improved.

Intensity may be used as the parameter indicating the brightness. In this case, the image processor 115 increases intensity in each of the pixels of the underwater image FD2. The intensity may be calculated based on, for example, the red, blue, and green components. An amount of increase in the intensity may be equal in all the pixels of the underwater image FD2.

To what extent the brightness of the underwater image FD2 is increased may be determined based on brightness of the above-water image FU2. For example, the image processor 115 may adjust the brightness of the underwater image FD2 so as to make a difference in brightness between the above-water image FU2 and the underwater image FD2 smaller than a predetermined brightness reference value. The original brightness of the above-water image FU2 and the underwater image FD2 for calculating the difference may be the average brightness of the plurality of captured images. For example, a sum total of brightness of pixels of the plurality of above-water images FU2 is divided by the product of the number of pixels per one image and the number of above-water images FU2. The calculated value of brightness can be used as the brightness of the above-water image FU2. The same also applies to the underwater image FD2. Hereinafter, the original brightness of the above-water image FU2 and the original brightness of the underwater image FD2 for calculating the difference may also be respectively referred to as above-water brightness and underwater brightness.

As described above, the reduced difference between the above-water brightness and the underwater brightness makes it easy for the user to see panoramic images. Also in the case of video, a sudden change in brightness is less likely to occur, thereby making it easy for the user to see the video.

Figure 15:
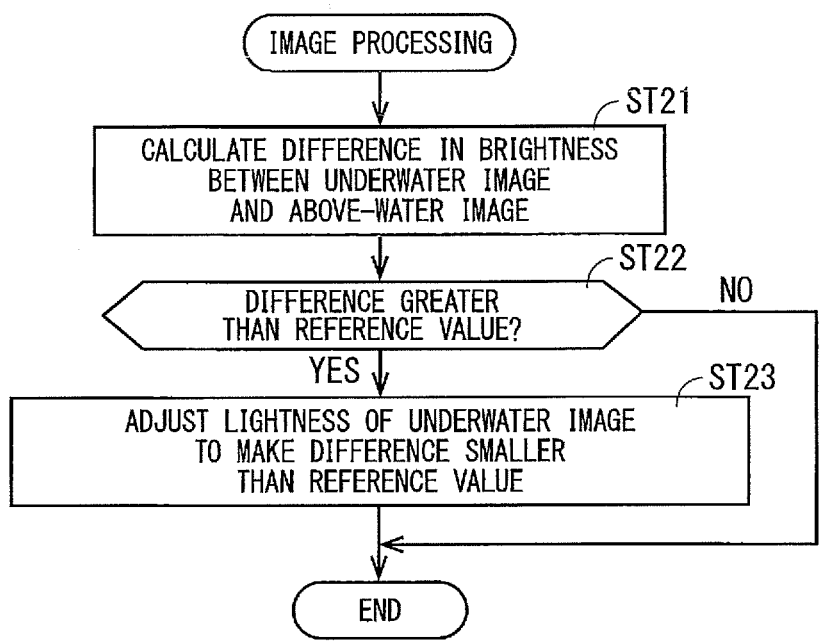
FIG. 15 illustrates a flowchart showing one example of specific actions of an image processor.

FIG. 15 illustrates a flowchart showing one example of specific actions of the image processor 115. In Step ST21, the image processor 115 calculates a difference between the underwater brightness and the above-water brightness. In Step ST22, the image processor 115 then determines whether the difference is greater than the brightness reference value. For example, the brightness reference value may be previously stored in the storage medium (such as the storage medium 103). This also applies to the other reference values, which will be described below, so that the description will not be repeated. If it is determined that the difference is greater than the brightness reference value, the image processor 115 performs image processing for increasing brightness on the underwater image FD2 so as to make the difference smaller than the brightness reference value in Step ST23. Then, the image processor 115 ends the processing. If it is determined that the difference is smaller than the brightness reference value, the image processor 115 ends the processing without executing Step ST23.

The panoramic image includes each portion of the plurality of captured images. For example, the panoramic image in FIG. 14 includes the portions of the plurality of captured images that are aligned in the vertical direction. An above-water region U2 in the panoramic image that includes each portion of the above-water images FU2 can be assumed to be a region of the above-water scene. Similarly, an underwater region D2 that includes each portion of the underwater images FD2 can be assumed to be a region of the underwater scene. For example, in FIG. 14, the above-water region U2 is located above a water surface G4 including the portion of the water surface image FW2, and the underwater region D2 is located below the water surface G4.

For the panoramic image described above, the above-mentioned image processing may be performed on the generated panoramic image instead of the captured images that are the original of the panoramic image. In other words, the image processor 115 may perform the image processing for increasing brightness on the underwater region D2 so as to make the difference in brightness between the above-water region U2 and the underwater region D2 smaller than the brightness reference value. For example, the image processor 115 generates region information indicating the above-water region U2 and the underwater region D2 when generating the panoramic image. The image processor 115 calculates the brightness of each of the above-water region U2 and the underwater region D2 based on the region information, to thereby calculate the difference in brightness. The brightness of the above-water region U2 may be calculated from a sum total of brightness of the pixels in the above-water region U2 divided by the number of pixels. The same also applies to the brightness of the underwater region D2. The image processor 115 performs the image processing for increasing brightness on the underwater region D2 in the panoramic image so as to make the difference smaller than the brightness reference value. The image processor 115 increases the brightness of, for example, all the pixels in the underwater region D2 to the same level.

Such a configuration can reduce the difference in brightness between the above-water region U2 and the underwater region D2, thereby making it easy for the user to see the panoramic image. The processing of such a configuration processes the smaller number of pixels than the processing performed on the captured images, which are the original of the panoramic image, thereby reducing the load on the processing.

<Second Correction Example of Brightness>

The image processor 115 stores the plurality of captured images after the image processing as the video or stores the panoramic image after the image processing in the storage medium (such as the storage medium 103). In other words, the image whose brightness has been adjusted (hereinafter may also be referred to as a past image) is stored. The image processor 115 may store the above-water brightness of the past image and the amount of adjustment to (specifically, the amount of increase in) the brightness of the underwater image FD2 corresponding to the past image.

The image processor 115 may perform image processing for adjusting brightness of the underwater image FD2 based on the past images stored in the storage medium. For example, the image processor 115 calculates the above-water brightness to calculate a difference between the calculated above-water brightness and the above-water brightness of every past image stored in the storage medium. If any past image has the difference smaller than a similar reference value, the image processor 115 may refer to the amount of adjustment to the past image in order to adjust the brightness of the underwater image FD2. For example, the amount of adjustment to the past image is added to the brightness of each of the pixels of the underwater image FD2. In other words, if any past image has above-water brightness close to the above-water brightness of the captured above-water image FU2, the amount of adjustment to the brightness of the past image can be used.

The image processing on the panoramic image of the past can thus be used to perform the image processing on brightness.

Figure 16:
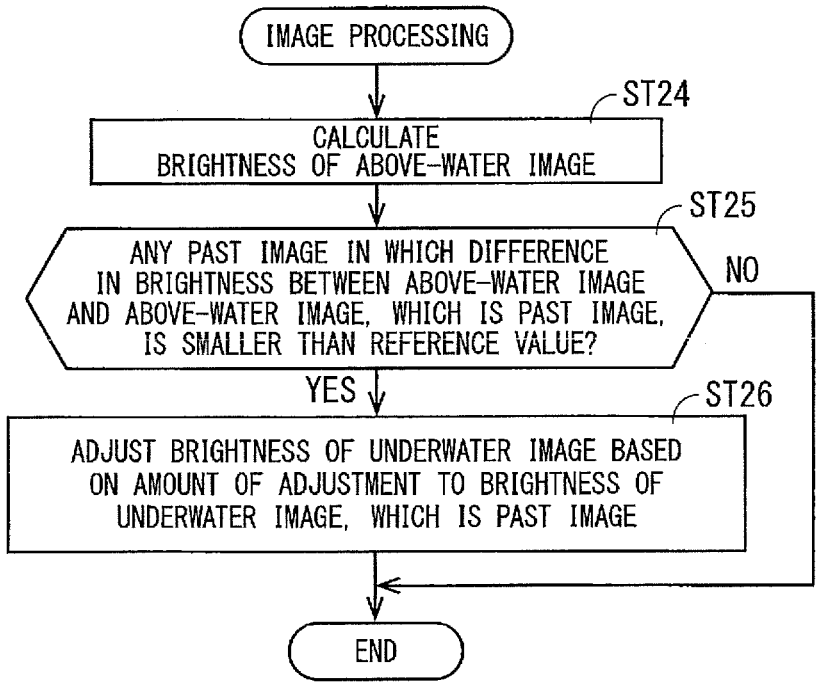
FIG. 16 illustrates a flowchart showing one example of specific actions of the image processor.

FIG. 16 illustrates a flowchart showing one example of specific actions of the image processor 115. In Step ST24, the image processor 115 calculates the brightness of the above-water image FU2. For example, the brightness of the above-water image FU2 is calculated from a sum total of the brightness of the pixels of the plurality of above-water images FU2 divided by the total number of pixels. In Step ST25, the image processor 115 then determines whether any past image in which the difference between the calculated above-water brightness and the above-water brightness of the above-water image FU2, which is the past image, is smaller than the similar reference value has been stored in the storage medium. If it is determined that the past image has been stored, the image processor 115 adjusts the brightness of the underwater image FD2 based on the amount of adjustment to the brightness of the underwater image FD2, which is the past image, in Step ST26. For example, the brightness of the underwater image FD2 is increased by the amount of adjustment to the past image. If it is determined that the past image has not been stored, the image processor 115 ends the processing without executing Step ST26. Alternatively, the image processor 115 may execute the processing in FIG. 15 without ending the processing.

The image processor 115 may perform the image processing on the panoramic image instead of the captured images, which are the original of the panoramic image, based on the past image. Specifically, the image processor 115 may adjust the brightness of the underwater region D2 in the panoramic image based on the amount of adjustment to the past image if the difference in brightness between the above-water region U2 in the panoramic image and the above-water region U2 in the past image is smaller than the reference value. This can reduce the total number of pixels on which the image processing is performed, thereby reducing the load on the processing.

<Correction Example of RGB Values>

A value of blue tends to increase and values of red and green tend to decrease in each pixel of a captured image in the water. The image processor 115 may perform image correction for reducing a gain value of blue on each of the pixels of the underwater image FD2. The gain value herein indicates an amount of correction of a value of each pixel of the captured image (original image). For example, the captured image (corrected image) can be generated by multiplying the value of the pixels of the captured image by the gain value. The image processor 115 may perform image processing for increasing a gain value of at least red or green on each of the pixels of the underwater image FD2. The image processor 115 may perform the image processing for reducing the gain value of blue and increasing the gain value of at least red or green on each of the pixels of the underwater image FD2. For example, the image processor 115 may subtract a predetermined amount from the gain value of blue and add a predetermined amount to each of the gain values of red and green. The reduced amount of the blue gain value and the increased amount of the red and green gain values may be each set previously and stored in the storage medium. The image processing enables reproduction to make the color of the underwater scene similar to the color of the above-ground scene. Therefore, the user can easily see the underwater image FD2.

Figure 17:
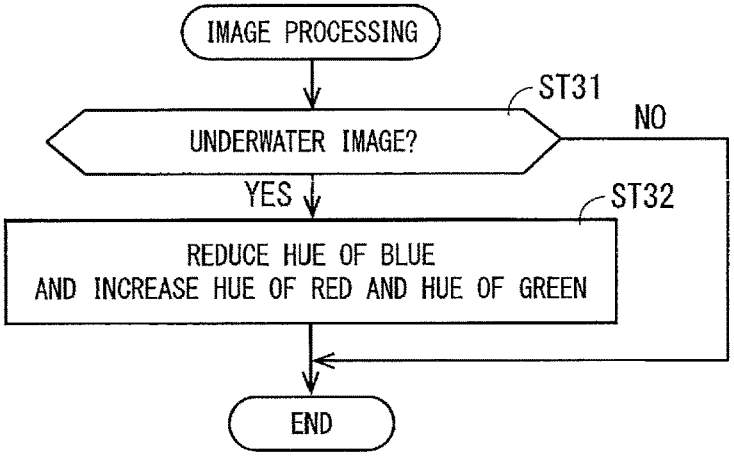
FIG. 17 illustrates a flowchart showing one example of specific actions of the image processor.

FIG. 17 illustrates a flowchart showing one example of actions of the image processor 115. The actions in the flowchart of FIG. 17 are performed on every captured image. First, the image processor 115 determines whether the captured image is the underwater image FD2 in Step ST31. If it is determined that the captured image is the underwater image FD2, the image processor 115 performs the image processing for increasing the gain value of red in each of the pixels on the captured image in Step ST32. In Step ST32, the image processor 115 may perform the image processing for increasing the gain value of green in each of the pixels on the captured image. In Step ST32, the image processor 115 may perform the image processing for reducing the gain value of blue and increasing the gain values of red and green in each of the pixels on the captured image. If it is determined that the captured image is not the underwater image FD2, the image processing 115 ends the processing.

The image processor 115 may perform level correction of every red, green, blue (namely, every red, blue, green channel) on the underwater image FD2 in addition to the correction of the RGB gain values. In other words, a value (level) of blue may be reduced while values (levels) of red and green may be increased. The amount of correction of level of each red, green, blue may be set previously and stored in the storage medium.

To generate the panoramic image, the above-mentioned image processing may be performed on the captured images, which are the original of the panoramic image, or on the underwater region D2 in the panoramic image. The latter case can reduce the total number of pixels on which the image processing is performed, thereby reducing the load on the processing.

<Correction Example of R Value>

Red, which is intense above the water in the setting sun, tends to be intense also in the water. The high value of red in each of the pixels of the above-water image FU2 may eliminate the need for the processing for increasing the gain value of red (or red value and the same hereinafter) in the underwater image FD2. In other words, the image processor 115 may increase the gain value of red in the underwater image FD2 if the red value in the above-water image FU2 is smaller than the reference value.

The high value of red in the above-water image FU2 indicates, for example, the high number of pixels having the red value greater than or equal to the predetermined value in the above-water image FU2. The variations of the red value may thus be indicated by, for example, values described next. In other words, the red value may be the total number of pixels having the red value greater than or equal to the predetermined value divided by the number of all pixels. For specific processing, the image processor 115 acquires the red value from each pixel and determines whether the red value is greater than or equal to the predetermined value. The predetermined value may be set previously and stored in the storage medium, for example. The image processor 115 calculates the total number of pixels having the red value greater than or equal to the predetermined value in one above-water image FU2. The image processor 115 performs the processing on all the pixels of the plurality of above-water images FU2 to calculate the total number of pixels having the red value greater than or equal to the predetermined value divided by the number of all the pixels of the plurality of above-water images FU2 (=the number of all the pixels of the above-water image FU2×the number of above-water images FU2). It can be determined that the red value is high if the image processor 115 determines that the result of the computation is greater than the reference value.

Alternatively, a value calculated from the sum total of the red values of the pixels of all the above-water images FU2 divided by the number of all pixels may be used. If the value is greater than the reference value, the image processor 115 may determine that the red value of the above-water image FU2 is high.

The image processor 115 may reduce the red value of the underwater image FD2 only when red in the above-water image FU2 is light. When red is intense in the water by the setting sun, red can be reflected as it is on the underwater image FD2. Therefore, the user can see the color of the underwater image FD2 similar to the actual color of the underwater scene by the setting sun.

Figure 18:
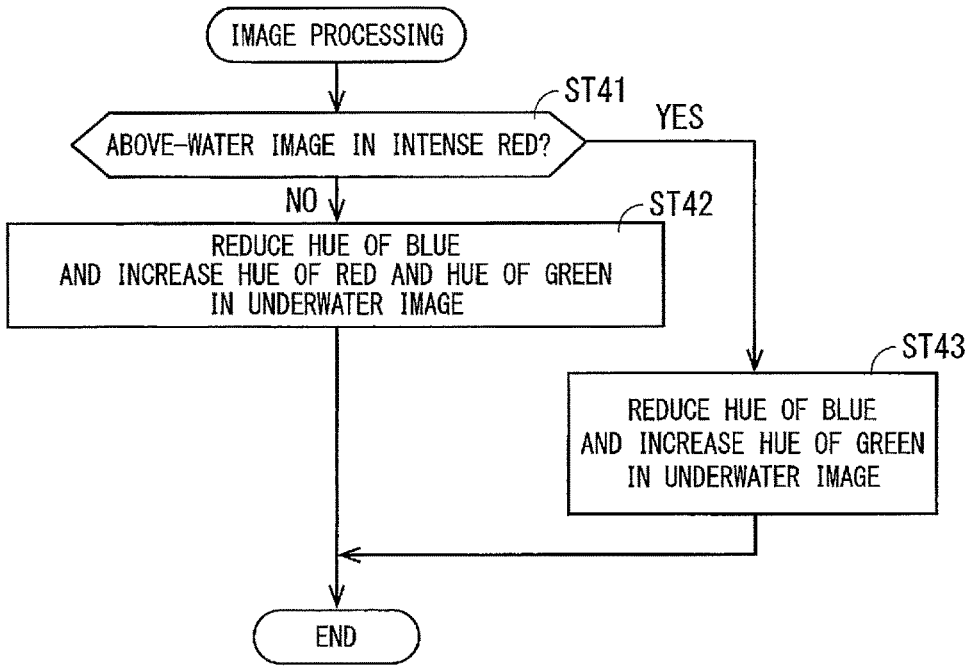
FIG. 18 illustrates a flowchart showing one example of specific actions of the image processor.

FIG. 18 illustrates a flowchart showing one example of actions of the image processor 115. In Step ST41, the image processor 115 determines whether the red value of the above-water image FU2 is high. If it is determined that the red value of the above-water image FU2 is small, the image processor 115 performs the image processing for increasing the red value on the underwater image FD2 in Step ST42. If it is determined that red is intense in the above-water image FU2, the image processor 115 ends the processing in step ST43. In other words, the image processor 115 does not perform the image processing for increasing the gain value of red if the above-water image FU2 has the high red value.

To generate the panoramic image, the above-mentioned image processing may be performed on the captured images, which are the original of the panoramic image, or on the underwater region D2 in the panoramic image. The latter case can reduce the total number of pixels on which the image processing is performed, thereby reducing the load on the processing.

<White Balance>

The image processor 115 may provide various types of white balance to the captured image. For example, the user can specify one of the various types of white balance. The specification is performed with, for example, the touch panel 130 or the operation button group 140. The image processor 115 can provide the white balance, which has been specified by the user, to the captured image. Examples of selectable white balance include white balance adjusted by weather (such as "for a cloudy day" and "for a sunny day"). The user who determines that it is cloudy during photography can specify the white balance for a cloudy day with the touch panel 130 or the operation button group 140. Since color temperature is high in a cloudy day, the image processor 115 may perform, for example, the image processing for reducing values of blue components and increasing values of red components on the image as the white balance for a cloudy day.

As described above, it is darker in the water than above the water. The brightness in the water is conceivably close to that in a cloudy day. The image processor 115 may thus provide the white balance for a cloudy day to the underwater image FD2 regardless of the selection by the user. This enables more appropriate white balance provided to the underwater image FD2.

Figure 19:
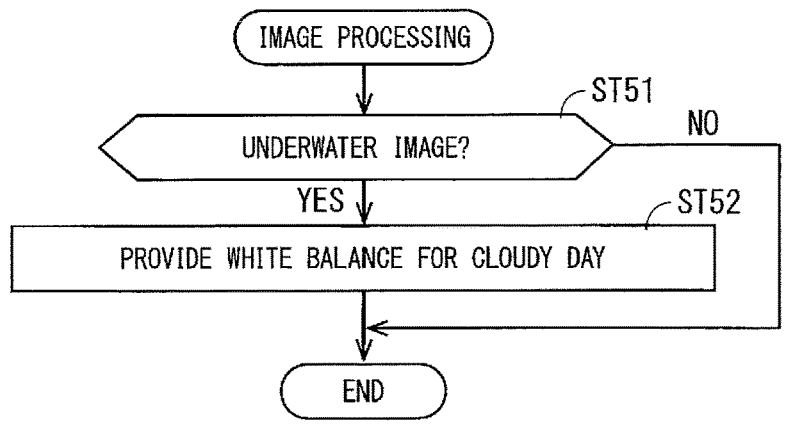
FIG. 19 illustrates a flowchart showing one example of specific actions of the image processor.

FIG. 19 illustrates a flowchart showing one example of specific actions of the image processor 115. The actions in the flowchart of FIG. 19 are performed on every captured image. In Step ST51, the image processor 115 determines whether the captured image is the underwater image FD2. If it is determined that the captured image is the underwater image FD2, the image processor 115 provides the white balance for a cloudy day to the underwater image FD2 in Step ST 52. If it is determined that the captured image is not the underwater image FD2, the image processor 115 ends the processing without executing Step ST52.

To generate the panoramic image, the above-mentioned image processing may be performed on the underwater images FD2, which are the original of the panoramic image, or the white balance for a cloudy day may be provided to the underwater region D2 in the panoramic image. The latter case can reduce the total number of pixels on which the image processing is performed, thereby reducing the load on the processing.

<Wind Velocity>

FIG. 20 illustrates a view schematically showing one example of the electrical configuration of the electronic apparatus 1. The electronic apparatus 1 further includes a wind velocity acquiring unit 220 in FIG. 20 compared to FIG. 3. The wind velocity acquiring unit 220 can acquire wind velocity information indicating a velocity of ambient wind. The wind velocity acquiring unit 220 can output the wind velocity information to the controller 100.

For example, the wind velocity acquiring unit 220 acquires the wind velocity information from an external weather server. The weather server stores the wind velocity information at each location. The wind velocity acquiring unit 220 includes a current position acquiring unit that includes, for example, a current position receiver. The current position receiver is, for example, a Global Positioning System (GPS) receiver. The current position receiver receives signals from a plurality of satellites and calculates a current position of the electronic apparatus 1 based on the signals. Alternatively, the current position acquiring unit may include a positional information receiver such as a Global Navigation Satellite System (GLONASS) receiver, a Galileo receiver, a Compass receiver, an Indian Regional Navigational Satellite System (IRNSS) receiver, and a Quasi-Zenith Satellite System (QZSS) receiver.

The current position acquiring unit may calculate the current position of the electronic apparatus 1 based on base stations that can communicate with the wireless communication unit 110. The base stations each set communication distance that enables communication with the wireless communication unit 110. If the wireless communication unit 110 can communicate with one base station, it is clear that the electronic apparatus 1 is located within the communication distance of the base station. If the wireless communication unit 110 can communicate with a plurality of base stations, it is clear that the electronic apparatus 1 is located within a region where the communication distances of the plurality of base stations overlap each other. The current position acquiring unit identifies the base stations that can communicate with the wireless communication unit 110 and calculates the current position based on the base stations. In this case, the current position acquiring unit may be installed on the controller 100 as one function.

The wind velocity acquiring unit 220 transmits the current position information indicating the current position and a request signal for requesting the wind velocity information to the weather server via the wireless communication unit 110. In response, the weather server transmits the wind velocity information in the received current position to the electronic apparatus 1. The wind velocity acquiring unit 220 receives the wind velocity information via the wireless communication unit 110. The function of transmitting and receiving the information to and from the weather server may be installed on the controller 100.

The wind velocity acquiring unit 220 may be a wind velocity sensor. For example, the wind velocity sensor may include a metal wire, a temperature sensor, and a current supply unit. The electronic apparatus 1 includes the metal wire exposed to the wind. The temperature sensor detects a temperature of the metal wire. The current supply unit passes a current through the metal wire so as to keep the temperature detected by the temperature sensor substantially constant. The higher wind velocity increases the current passing through the metal wire, so that the wind velocity sensor can obtain the wind velocity based on the current.

The higher wind velocity makes the flow of water faster, which often makes cloudy and dark in the water. This phenomenon is especially significant in natural water places (such as sea, rivers, and lakes) outside. For this reason, the image processor 115 may increase the brightness of the underwater image FD2 by an amount of increase according to the wind velocity. Specifically, the image processor 115 may increase the brightness of the underwater image FD2 at the higher wind velocity. This can suppress the reduced brightness of the underwater image FD2 even if it gets dark in the water due to the high wind velocity. Thus, the user can easily see the underwater image FD2.

FIG. 21 illustrates a flowchart showing one example of specific actions of the electronic apparatus 1. In Step ST61, the wind velocity acquiring unit 220 acquires the wind velocity information and outputs the wind velocity information to the controller 100. In Step ST62, the image processor 115 then adjusts the brightness of the underwater image FD2 by an amount of increase according to the wind velocity based on the wind velocity information. For example, the image processor 115 does not increase the brightness of the underwater image FD2 at the wind velocity lower than the wind reference value, and increases the brightness of the underwater image FD2 at the wind velocity higher than the wind reference value.

To generate the panoramic image, the above-mentioned image processing may be performed on the underwater images FD2, which are the original of the panoramic image, or on the underwater region D2 in the panoramic image. The latter case can reduce the total number of pixels on which the image processing is performed, thereby reducing the load on the processing.

FIG. 22 illustrates a view schematically showing another example of the electrical configuration of the electronic apparatus 1. The electronic apparatus 1 further includes a wind direction acquiring unit 221 in FIG. 22 compared to FIG. 20. The wind direction acquiring unit 221 can acquire wind direction information indicating a direction of ambient wind. The wind direction acquiring unit 221 can output the wind direction information to the controller 100.

For example, the wind direction acquiring unit 221 may acquire the wind direction information from the weather server. The weather server stores the wind direction information at each location. The wind direction acquiring unit 221 includes a current position acquiring unit. If the wind velocity acquiring unit 220 includes the current position acquiring unit, the wind velocity acquiring unit 220 and the wind direction acquiring unit 221 may share the current position acquiring unit. The wind direction acquiring unit 221 transmits a request signal for requesting the wind direction information and current position information to the weather server via the wireless communication unit 110. In response, the weather server transmits the wind direction information in the received current position to the electronic apparatus 1. The wind direction acquiring unit 221 receives the wind direction information via the wireless communication unit 110. The function of transmitting and receiving the information to and from the weather server may be installed on the controller 100.

The image processor 115 determines whether the wind direction is a direction from the land to the water (such as the sea). For example, the storage medium (such as the storage medium 103) stores map information. The map information includes information indicating positions of lands and sea. The map information may be previously stored in the storage medium, or may be acquired from an external map server to be previously stored in the storage medium.

The image processor 115 obtains the positional relationship between the sea and the land in the current position based on the map information, and then determines whether the wind is blowing from the land to the sea based on the wind direction information. If the wind is blowing from the land to the sea, the image processing for increasing the brightness of the underwater image FD2 by the amount of increase according to the wind velocity is not performed. The reason is that the wind blowing from the land to the sea is less likely to turn the water cloudy. This can thus avoid increasing the brightness of the underwater image FD2 unnecessarily.

Figure 23:
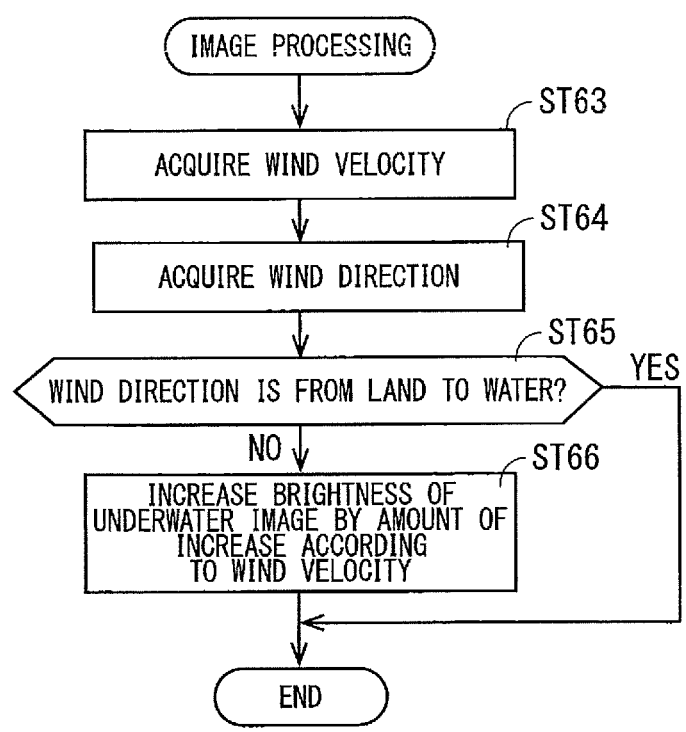
FIG. 23 illustrates a flowchart showing one example of specific actions of the electronic apparatus.

FIG. 23 illustrates a flowchart showing one example of the actions of the electronic apparatus 1. First, in Step ST63, the wind velocity acquiring unit 220 acquires the wind velocity information. In Step ST64, the wind direction acquiring unit 221 then acquires the wind direction information. Steps ST63, ST64 may be executed in the reverse order or executed simultaneously. In Step ST65, the image processor 115 then determines whether a wind direction indicated in the wind direction information is a direction from the land to the water. If it is determined that the wind direction is not the direction from the land to the water, the brightness of the underwater image FD2 is increased by the greater amount of increase according to the higher wind velocity in Step ST66. Subsequently, the actions are ended. If it is determined that the wind direction is the direction from the land to the water, the actions are ended without Step ST66 executed by the image processor 115.

To generate the panoramic image, in Step ST66, the above-mentioned image processing may be performed on the underwater images FD2, which are the original of the panoramic image, or on the underwater region D2 in the panoramic image. The latter case can reduce the total number of pixels on which the image processing is performed, thereby reducing the load on the processing.

<Waves>

Waves formed in the sea change the position of the water surface. High waves greatly change the position of the water surface. Relative positions of the electronic apparatus 1 and the water surface are changed by not only the movement of the electronic apparatus 1 but also the waves. Since the above-mentioned method for identifying the water surface image FW2 does not give consideration to the change in the position of the water surface by the waves, high waves may decrease the accuracy of identifying the water surface image FW2. The user may be notified when the height of the waves is higher than a wave height reference value. Thus, the user can be previously informed that the accuracy of identifying the water surface image will decrease.

FIG. 24 illustrates a view schematically showing another example of the electrical configuration of the electronic apparatus 1. The electronic apparatus 1 further includes a wave height acquiring unit 240 in FIG. 24 compared to FIG. 3. The wave height acquiring unit 240 can acquire wave height information indicating a height of waves. The wave height acquiring unit 240 can output the wave height information to the controller 100.

The wave height acquiring unit 240 may acquire the wave height information from, for example, the weather server. The weather server stores the wave height information at each location of the sea, for example. The wave height acquiring unit 240 includes a current position acquiring unit. If the electronic apparatus 1 includes the wind velocity acquiring unit 220 or the wind direction acquiring unit 221, the wave height acquiring unit 240 may share the current position acquiring unit with the wind velocity acquiring unit 220 or the wind direction acquiring unit 221. The wave height acquiring unit 240 transmits a request signal for requesting the wave height information and current position information to the weather server via the wireless communication unit 110. In response, the weather server transmits the wave height information in the received current position to the electronic apparatus 1. The wave height acquiring unit 240 receives the wave height information via the wireless communication unit 110. The function of transmitting and receiving information to and from the weather server may be installed on the controller 100.

It can also be assumed that a wave height detection apparatus for detecting a height of waves is located close. For example, the wave height detection apparatus detects a position in a height direction of a float on the sea to detect the height of the waves. The wave height acquiring unit 240 may wirelessly communicate with the wave height detection apparatus to acquire the wave height information.

Figure 25:
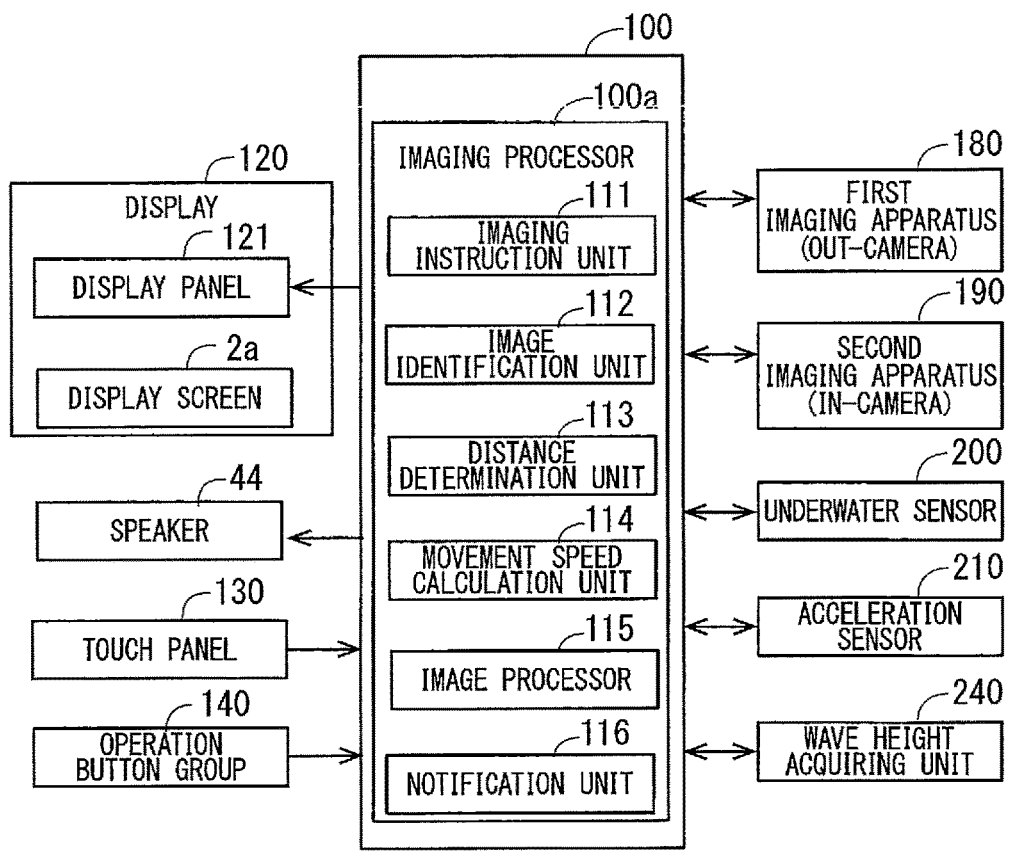
FIG. 25 illustrates a view schematically showing one example of the internal configuration of the controller.
Figure 26:
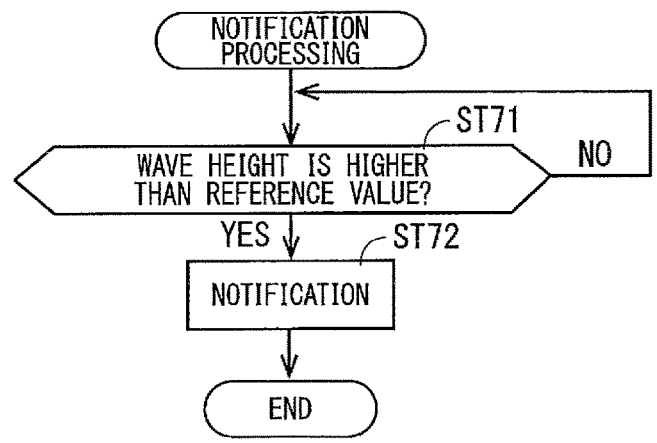
FIG. 26 illustrates a flowchart showing one example of specific actions of a notification unit.

FIG. 25 illustrates a functional block diagram schematically showing one example of the internal configuration of the controller 100. In one example of FIG. 25, the controller 100 further includes a notification unit 116. The notification unit 116 notifies the user when the height of the waves indicated in the wave height information is higher than the wave height reference value. FIG. 26 illustrates a flowchart showing one example of specific actions of the notification unit 116. The actions may be performed simultaneously with each of the above-mentioned flowcharts. In Step ST71, the notification unit 116 determines whether the height of the waves is higher than the wave height reference value based on the wave height information acquired by the wave height acquiring unit 240. If it is determined that the height of the waves is higher than the wave height reference value, the notification unit 116 notifies the user of this situation in Step ST72. For example, the notification unit 116 may display the information indicating the decrease in the accuracy of identifying the water surface image due to the high waves on the display 120. Alternatively, the notification unit 116 may make the notification with the speaker 170. The notification unit 116 may vibrate a vibration apparatus if the electronic apparatus 1 includes the vibration apparatus. The user is notified by the vibrations of the vibration apparatus transmitted through the exterior 4 of the electronic apparatus 1. If it is determined that the height of the waves is lower than the wave height reference value in Step ST71, the notification unit 116 executes Step ST71 again.

<Water-Surface Positional Information>

The image processor 115 may generate water-surface positional information when generating the panoramic image. The water-surface positional information indicates a position of the water surface in the panoramic image. When generating the panoramic image, the image processor 115 uses the portion of the water surface image FW2 as the portion of the panoramic image, which indicates the water surface. The image processor 115 may generate the water surface region, which is the portion of the panoramic image, as the water-surface positional information.

The controller 100 stores the water-surface positional information together with the panoramic image in the storage medium (such as the storage medium 103). Thus, the panoramic image with the water-surface positional information is stored every time the user performs the panoramic photography with the electronic apparatus 1. Therefore, the storage medium stores the plurality of panoramic images and the corresponding pieces of water-surface positional information.

Figure 27:
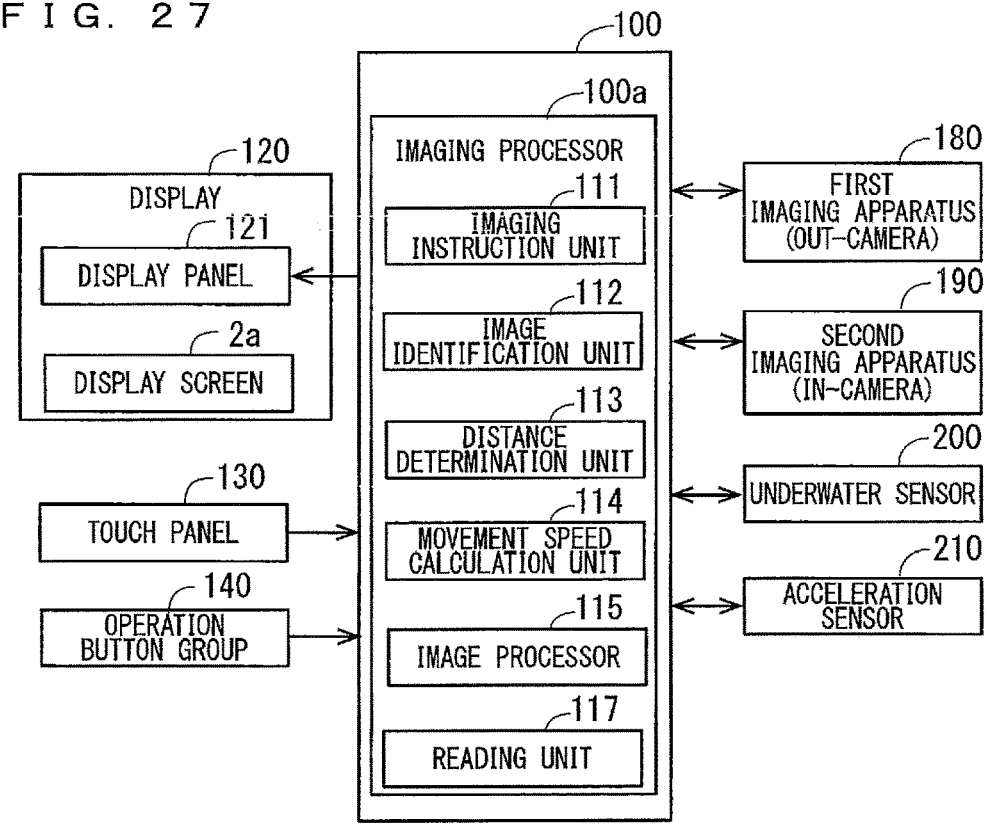
FIG. 27 illustrates a view schematically showing one example of the internal configuration of the controller.

FIG. 27 illustrates a view showing one example of the internal configuration of the controller 100. The controller 100 further includes a reading unit 117 in FIG. 27 compared to FIG. 11. The reading unit 117 can display the plurality of panoramic images arranged in alignment in response to the input by the user on the display 120 (also see FIG. 28). More specifically, the reading unit 117 can read the plurality of panoramic images and the water-surface positional information corresponding to the panoramic images from the storage medium. The reading unit 117 can display the plurality of panoramic images such that the water surface in each of the plurality of panoramic images continues throughout the plurality of panoramic images on the display 120.

Figure 28:
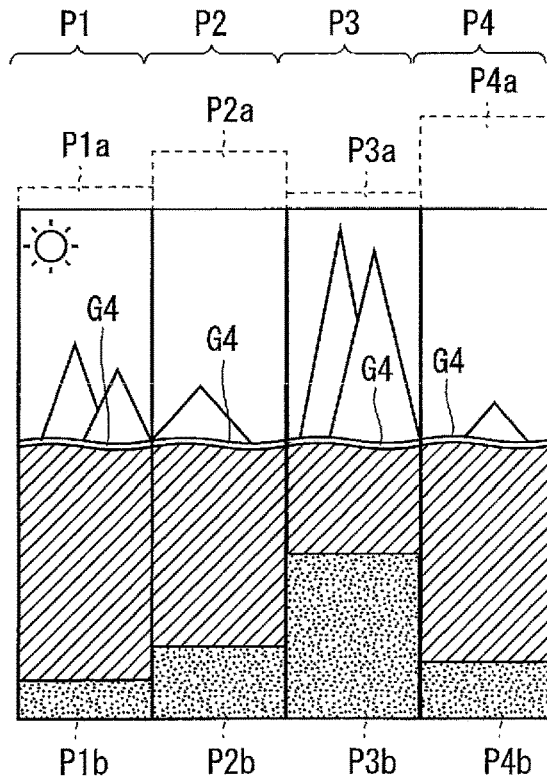
FIG. 28 illustrates a view schematically showing one example of displayed panoramic images.

FIG. 28 illustrates a view schematically showing one example of displayed panoramic images. In one example of FIG. 28, panoramic images P1 to P4 aligned in one direction are displayed. In one example of FIG. 28, the panoramic images P1 to P4, which are elongated in the vertical direction and aligned in the short-side direction (or the horizontal direction), are displayed. In one example of FIG. 28, the panoramic image P2 is displayed on the right side of the panoramic image P1, the panoramic image P3 is displayed on the right side of the panoramic image P2, and the panoramic image P4 is displayed on the right side of the panoramic image P3. The panoramic images P1 to P4 each include the water surface G4. The reading unit 117 adjusts the display positions in the horizontal direction of the panoramic images P1 to P4 such that the water surface G4 continues.

For example, the reading unit 117 moves the panoramic image P2 closer to the upper side than the panoramic image P1 is to display the panoramic images P1, P2 such that a difference in position between the right end of the water surface in the panoramic image P1 and the left end of the water surface in the panoramic image P2 is smaller than a predetermined value. That is to say, the panoramic images P1, P2 are displayed such that the water surfaces in the panoramic images P1, P2 are continuously connected. Similarly, the reading unit 117 adjusts the position in the horizontal direction of the panoramic image P3 such that a difference in position between the left end of the water surface in the panoramic image P3 and the right end of the water surface in the panoramic image P2 is smaller than a predetermined value. The same also applies to the panoramic image P4.

In this manner, the water surface continues throughout the panoramic images P1 to P4, allowing the user to easily see the overall view of the panoramic images P1 to P4 combined together into one.

The appropriate movement of the panoramic images P1 to P4 in the horizontal direction may cause a difference in level of the upper ends and the lower ends of the panoramic images P1 to P4. The different lengths of the panoramic images P1 to P4 in the long-side direction may also cause the difference in level. The reading unit 117 may thus align the upper ends and the lower ends of the panoramic image P1 to P4 for display. For example, to eliminate the difference in level of the upper ends of the panoramic images P1 to P4, the reading unit 117 may appropriately remove upper end portions P1a, P2a, P3a, P4a of the panoramic images P1 to P4 to align the upper ends of the panoramic images P1 to P4. In one example of FIG. 28, the removed upper end portions P1a, P2a, P3a, P4a are indicated by the broken lines.

Moreover, to eliminate the difference in level of the lower ends of the panoramic images P1 to P4, the reading unit 117 may add images that fill the difference in level to the lower end side of the panoramic images P1 to P4. Any images can be used. For example, the image may show a section of an imaginary ground. In one example of FIG. 28, images P1b, P2b, P3b, P4b are added to the lower end side of the panoramic images P1 to P4, respectively.

The images that fill the difference in level of the upper ends of the panoramic images P1 to P4 may be added to the upper end side of the panoramic images P1 to P4, or the lower end portion of each of the panoramic images P1 to P4 may be appropriately removed to eliminate the difference in level of the lower ends of the panoramic images P1 to P4.

While the electronic apparatus, the method for controlling the electronic apparatus, and the non-transitory computer readable recording medium have been described above in detail, the above description is in all aspects illustrative and not restrictive, and the present disclosure is not limited thereto. The modifications described above are applicable in combination as long as they are not mutually inconsistent. It is understood that numerous modifications which have not been exemplified can be devised without departing from the scope of the present disclosure.

What is claimed is:

1. An electronic apparatus, comprising:
an exterior;
an underwater sensor configured to detect an underwater state in which at least part of the exterior is located in the water and an above-water state in which the at least part of the exterior is not located in the water;
an acceleration sensor configured to detect acceleration;
an image sensor that includes a transparent member located in the exterior and is configured to receive light entering through the transparent member and generate a captured image; and
at least one processor configured to identify a water surface image among a plurality of captured images generated by the image sensor, based on the acceleration and a transition timing at which one of the underwater state and the above-water state changes to the other state, the water surface image being captured when the transparent member reaches a water surface.

2. The electronic apparatus according to claim 1, wherein a distance between the transparent member and the water surface at the transition timing differs according to an inclination of the exterior with respect to a reference plane,
the electronic apparatus further comprises a storage medium that previously stores the distance according to the inclination of the exterior as distance information, and
the at least one processor is configured to
calculate the inclination and movement speed of the exterior at the transition timing based on the acceleration,
determine the distance based on the calculated inclination of the exterior and the distance information,
calculate a water surface timing at which the transparent member reaches the water surface based on the determined distance, the calculated movement speed, and the transition timing, and
identify the water surface image based on the water surface timing.

3. The electronic apparatus according to claim 1, wherein the at least one processor is configured to
categorize the captured images as an underwater image and an above-water image based on the detection results of the underwater sensor and the identified water surface image, and
perform different image processing on the underwater image and the above-water image.

4. The electronic apparatus according to claim 3, wherein the at least one processor is configured to adjust brightness of the underwater image so as to make a difference in brightness between the above-water image and the underwater image smaller than a predetermined value by the image processing.

5. The electronic apparatus according to claim 4, wherein the at least one processor is configured to
store, as past information, the brightness of the above-water image and an amount of adjustment to the brightness of the underwater image in the image processing,
identify a present water surface image, which is the water surface image, among present captured images, which are the plurality of captured images generated after the past information is stored,
categorize the present captured images as a present above-water image and a present underwater image, which are respectively the above-water image and the underwater image, based on the present water surface image, and
adjust brightness of the present underwater image based on the amount of adjustment when a difference in brightness between the present above-water image and the above-water image in the past information is smaller than a reference value.

6. The electronic apparatus according to claim 3, wherein the at least one processor is configured to increase a value of green in the underwater image by the image processing.

7. The electronic apparatus according to claim 3, wherein the at least one processor is configured to increase a value of red in the underwater image by the image processing.

8. The electronic apparatus according to claim 7, wherein the at least one processor is configured to
determine whether red is intense in the underwater image, and
increase the value of red in the underwater image only when red is light in the underwater image.

9. The electronic apparatus according to claim 3, wherein the at least one processor is configured to reduce a value of blue in the underwater image by the image processing.

10. The electronic apparatus according to claim 3, wherein the at least one processor is configured to provide white balance for a cloudy day to the underwater image by the image processing.

11. The electronic apparatus according to claim 3, further comprising a wind velocity acquiring unit configured to acquire wind velocity information, wherein the at least one processor is configured to increase brightness of the underwater image at higher wind velocity indicated in the wind velocity information by the image processing.

12. The electronic apparatus according to claim 11, further comprising: a wind direction acquiring unit configured to acquire wind direction information; and a storage medium that stores map information, wherein the at least one processor is configured to determine whether a wind direction indicated in the wind direction information is a direction from water to a land, and increase the brightness of the underwater image according to the wind velocity only when the wind direction is the direction from the water to the land.

13. The electronic apparatus according to claim 3, wherein the at least one processor is configured to
combine the plurality of captured images before the image processing to generate a panoramic image wider than a photographic range of the image sensor,
perform image processing for the above-water image on a first region formed by the above-water image in the panoramic image, and
perform image processing for the underwater image on a second region formed by the underwater image in the panoramic image.

14. The electronic apparatus according to claim 1, wherein the at least one processor is configured to
combine the plurality of captured images to generate a panoramic image wider than a photographic range of the image sensor, and
generate water-surface positional information indicating a position of a water surface in the panoramic image based on the water surface image.

15. The electronic apparatus according to claim 14, further comprising:
a display; and a storage medium that stores a plurality of the panoramic images and pieces of the water-surface positional information corresponding to the plurality of panoramic images, wherein the at least one processor is configured to display, on the display, the plurality of panoramic images arranged in alignment such that the water surface in each of the plurality of panoramic images continues throughout the plurality of panoramic images based on the pieces of water-surface positional information.

16. A method for controlling an electronic apparatus, comprising:

detecting an underwater state in which at least part of an exterior of the electronic apparatus is located in the water and an above-water state in which the at least part of the exterior is not located in the water;

detecting acceleration;

receiving light through a transparent member located in the exterior and generating a captured image; and identifying a water surface image among a plurality of captured images generated, based on a transition timing at which one of the underwater state and the above-water state changes to the other state and the acceleration, the water surface image being captured when the transparent member reaches a water surface.

17. A non-transitory computer readable recording medium configured to store a control program for controlling an electronic apparatus, the control program causing the electronic apparatus to execute the steps of:

detecting an underwater state in which at least part of an exterior of the electronic apparatus is located in the water and an above-water state in which the at least part of the exterior is not located in the water;

detecting acceleration;

receiving light that enters through a transparent member located in the exterior and generating a captured image; and identifying a water surface image among a plurality of captured images generated, based on a transition timing at which one of the underwater state and the above-water state changes to the other state and the acceleration, the water surface image being captured when the transparent member reaches a water surface.

* * * * *